United States Patent
Goodspeed et al.

(10) Patent No.: US 10,242,227 B1
(45) Date of Patent: *Mar. 26, 2019

(54) SHARING DIGITAL LIBRARIES

(71) Applicant: Amazon Technologies, Inc., Seattle, WA (US)

(72) Inventors: Joshua M. Goodspeed, London (GB); Peter Thomas Killalea, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,933

(22) Filed: Dec. 18, 2017

Related U.S. Application Data

(63) Continuation of application No. 15/347,651, filed on Nov. 9, 2016, now Pat. No. 9,852,310, which is a continuation of application No. 13/626,678, filed on Sep. 25, 2012, now Pat. No. 9,495,551.

(51) Int. Cl.
    *G06F 17/30*     (2006.01)
    *G06F 21/62*     (2013.01)
    *H04L 29/06*     (2006.01)

(52) U.S. Cl.
    CPC ........ *G06F 21/6245* (2013.01); *H04L 63/102* (2013.01)

(58) Field of Classification Search
    USPC .................. 707/609, 705, 790, 813, 821
    See application file for complete search history.

(56) References Cited

U.S. PATENT DOCUMENTS

| | | | |
|---|---|---|---|
| 2003/0130952 A1* | 7/2003 | Bell | G06Q 30/06 705/51 |
| 2013/0216206 A1* | 8/2013 | Dubin | H04N 9/87 386/282 |

OTHER PUBLICATIONS

Final Office Action for U.S. Appl. No. 13/626,678, dated Feb. 20, 2015, Joshua M. Goodspeed, "Sharing Digital Libraries", 12 pages.

(Continued)

*Primary Examiner* — Sana A Al-Hashemi
(74) *Attorney, Agent, or Firm* — Lee & Hayes, P.C.

(57) ABSTRACT

In some implementations, a first user associated with a first user account may send a request to exchange digital libraries with a second user associated with a second user account. Upon acceptance, the second user receives first library information associated with the first user account that identifies content items that may be accessed by the second user due to the exchange. Similarly, the first user receives second library information associated with the second user account that identifies second content items that may be accessed by the first user. In other examples, a user may access the digital library of a selected person or entity, such as a historical figure, celebrity, author, friend, or organization. Additionally, in some cases, a user may view content of a content item that a selected person is currently reading, and which may include annotations made to the content item by the selected person.

20 Claims, 13 Drawing Sheets

(56) References Cited

OTHER PUBLICATIONS

Office action for U.S. Appl. No. 13/626,678, dated Jan. 12, 2016, Goodspeed et al., "Sharing Digital Libraries", 13 pages.
Final Office Action for U.S. Appl. No. 15/347,651, dated Jun. 6, 2017, Joshua M. Goodspeed, "Sharing Digital Libraries", 5 pages.
Office action for U.S. Appl. No. 13/626,678, dated Aug. 11, 2015, Goodspeed et al., "Sharing Digital Libraries", 12 pages.
Office action for U.S. Appl. No. 13/626,678, dated Aug. 28, 2014, Goodspeed et al., "Sharing Digital Libraries", 10 pages.

* cited by examiner

SHARING DIGITAL LIBRARIES

CROSS REFERENCE TO RELATED APPLICATION

This patent application is a continuation of and claims priority to co-pending and co-owned U.S. patent application Ser. No. 15/347,651. filed Nov. 9, 2016, entitled "SHARING DIGITAL LIBRARIES," which is a continuation of and claims priority to U.S. patent application Ser. No. 13/626,678 filed Sep. 25, 2012, entitled "SHARING DIGITAL LIBRARIES", both of which are hereby incorporated in their entirety by reference.

BACKGROUND

The continued proliferation of digital content items has led to an increase in the availability of such content, as well as an increase in the availability of electronic devices and applications used for consuming these content items. For instance, users consume content items, such as electronic books (eBooks), digital videos, digital songs, digital images, and the like, on an assortment of electronic devices. As the number of content items and devices for consuming content items continues to increase, users are ever more interested in enhancing their experiences and gaining knowledge while consuming these content items. For instance, a user's experience may be enhanced by being able to access collections of content items that have been acquired by others, which, for example, may expose a user to new content items that may be of interest to the user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
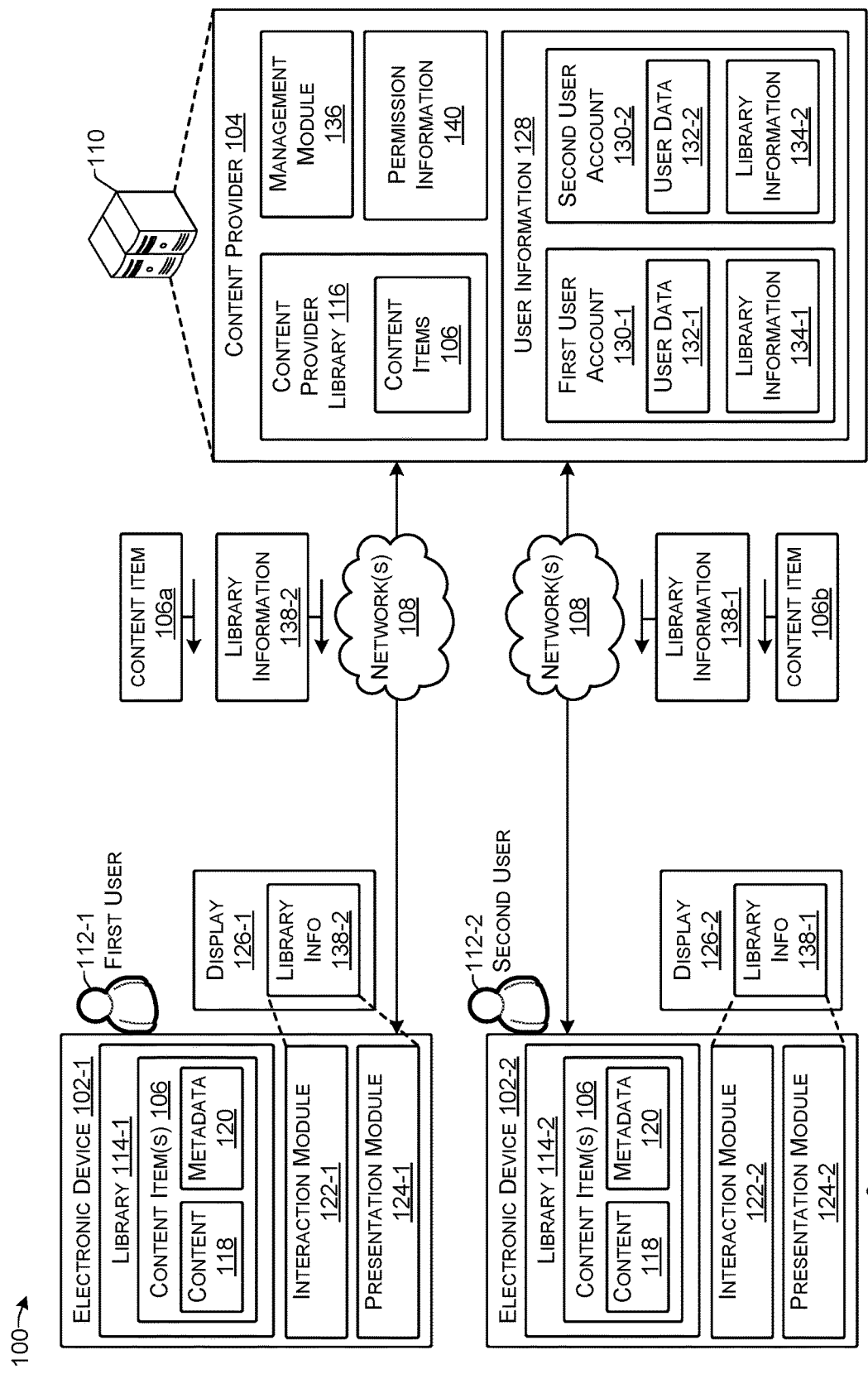
FIG. 1 illustrates an example system architecture for sharing digital libraries according to some implementations.

This disclosure includes techniques and arrangements for enabling sharing or exchanging of a digital content item library. For example, a first user of an electronic device may want to access a digital library of a second user or exchange libraries with the second user. Accordingly, in some cases, the first user may send a request to the second user as an invitation to facilitate the exchanging of permission to access the digital content libraries. If the second user accepts the request, the first user may have access to the digital library of the second user and the second user may have access to the digital library of the first user. For example, the first user may view, download and consume digital content items that are contained in the library of the second user, and the second user may download and consume digital content items that are contained in the library of the first user. In some cases, constraints may be placed on the library exchange and/or the access to the content items in the other user's library. For example, the exchange may be permitted to extend for a limited period of time or may be limited to specified amount of content, particular types of content items, and so forth. Furthermore, during the exchange, the first user may be denied access to the first user's library and the second user may be denied access to the second user's library.

In some implementations, a user may browse, access and view content items contained in a library of another person, such as an historical figure, a celebrity, an author, or the like. For instance, a user may select a library of a particular person or entity to browse, such as for a fee, or as part of a promotion. Thus, if the user accesses the library of a celebrity, the user may be presented with library information that displays the contents of the celebrity's library. For example, a user may be able to download, view, read or otherwise consume content items contained in the library of the celebrity, such up to a predetermined quantity of content, or for a paid duration. Furthermore, in some examples, annotations made by the celebrity, such as personal notes, highlights, comments, recommendations, reviews, or other annotations to a content item may be included in the content items made available to be viewed by the user that has obtained access to the library of the celebrity.

Additionally, in some examples, the user may be able to view a content item that is currently being read or otherwise consumed by a celebrity, author, educator, or other particular person. For example, the user may view a page of a book that the particular person is currently reading, and may further view any personal annotations, comments, or the like, that the particular person has made in the content item. In some examples, the user may view a percentage of the content item for free and without purchasing the content item. After the user has consumed a certain amount of the content item, e.g., a number of pages, a percentage of the total content, or the like, the user may be offered the opportunity to purchase full access to the content item in order to continue to view or consume additional parts of the content item.

For discussion purposes, some example implementations are described in the environment of sharing or providing access to a digital library of digital content items. However, the implementations herein are not limited to the particular examples provided, and may be extended to other types of content items, collections of content items, and other interface configurations, as will be apparent to those of skill in the art in light of the disclosure herein.

Example Architecture

FIG. 1 illustrates an example architecture of a system 100 for sharing a digital library according to some implementations. In some instances, the library may be accessed via one or more electronic devices 102 capable of presenting digital content. As discussed additionally below, some examples of the electronic devices 102 may include digital media devices and eBook readers; tablet computing devices; desktop, terminal and workstation computing devices; smart phones and mobile devices; laptop and netbook computing devices; televisions; gaming systems; home electronic devices; automotive electronic devices; and any other device capable of accessing and rendering digital content items, online content, mobile content, textual content, or the like.

In the illustrated example, a plurality of electronic devices 102, such as electronic devices 102-1, 102-2, . . . , may communicate with a content provider 104 to access or receive at least one content item 106 over one or more networks 108. For example, the network(s) 108 may include a local area network (LAN), a wide area network (WAN), such as the Internet, or any combination thereof, and may include both wired and wireless communication technologies using any suitable protocols and communication techniques. Each electronic device 102 may communicate over network(s) 108 with one or more computing devices 110 of the content provider 104. For example, the electronic devices 102 and the one or more computing devices 110 may communicate and interact with one another using any combination of suitable communication and networking protocols, such as Internet protocol (IP), transmission control protocol (TCP), hypertext transfer protocol (HTTP), and so forth. In some cases, the electronic device 102 may download the content item 106, while in other cases the content item 106 may be streamed to the electronic device 102. Additionally, in some examples, the electronic devices 102-1, 102-2 may communicate with each other over the network(s) 108.

The content provider 104 may maintain an online location, such as a merchant website, an e-commerce site, or other functionality that offers one or more content items 106 to the public. Alternatively, the content provider 104 may provide the content item 106, or make the content item 106 available, to one or more electronic devices 102 through online or mobile applications executing on the electronic devices 102.

In some cases, the content item 106 may be a book or electronic book (eBook) including one or more pages of text. For example, the electronic device may present the text of an eBook and any images, illustrations, tables, maps, graphic elements, or embedded multimedia content that might be contained in the eBook. The terms "book" and/or "eBook," as used herein, may broadly include electronic or digital representations of printed works, as well as digital content that may include text, multimedia, hypertext, and/or hypermedia. Examples of content items 106 may include, but are not limited to, electronic versions of books, magazines, newspapers, periodicals, journals, reference materials, textbooks, anthologies, instruction manuals, proceedings of meetings, forms, directories, web pages, plays, screen plays, closed captioning transcripts of movies and television shows, song lyrics, and so forth, as well as other types of content items including text that the user may view or interact with using the electronic device 102. Accordingly, a content item 106 may include any readable or viewable textual content that is in electronic or digital form. Additionally, some implementations herein are not limited to digital text items, but may also include other types of content items, such as digital audio (e.g., music, audible books, etc.), digital video (e.g., movies, television, short clips, etc.), images (e.g., art, photographs, etc.), interactive content, multi-media content, games, applications, and so forth.

The content items 106 of a user 112 may be included in a user library 114, which identifies the contents 106 to which the particular user has access. For example, a user may have purchased, borrowed, bartered-for, licensed, or otherwise acquired access to the content items 106 contained in the user's library 114. In the illustrated example, a first user 112-1 is associated with a first electronic device 102-1 that includes a first user library 114-1 that includes one or more content items 106. Similarly, a second user 112-2 is associated with a second electronic device 102-2 that includes a second user library 114-2 that includes one or more content items 106. In some examples, some or all of the content items 106 contained in a user library 114 may have been downloaded and stored on the user's electronic device 102, while in other examples, some or all of the content items 106 may be maintained at the content provider 104, such as in a content provider library 116 or at another location. For instance, in some examples, a user 112 may only have purchased the rights to stream a content item, or may only store a limited number of content items 106 on the electronic device 102, such as due to limited storage capacity or the like. Thus, in some implementations, the library 114 may include a data structure that represents the content items 106 to which the user has acquired the right of access, such as the right to view, read, play, or otherwise consume the content items, regardless of whether the content items 106 themselves are stored on the device 102 or elsewhere.

Each content item 106 may include content 118, such as text, images, multimedia, etc., and may further include metadata 120 that is associated with the content 118. For example, the content provider 104, an author, or a publisher may provide or may generate at least a portion of metadata 120 for a corresponding content item 106. Furthermore, in some examples the metadata 120 may include information added by a user, such as highlights, notes, bookmarks, or other annotations made by the user 112 to a corresponding content item 106. The metadata 120 may also include a record of the user's consumption progress through the content item, the last page accessed, furthest point reached, and the like. Each content item 106 may be made up of any number of files or may be a single file. For example, the content 118 may be stored on the electronic device 102 as one or more files that are separate from one or more files including the metadata 120. Alternatively, however, in other examples, the content 118 and the metadata 120 may be stored as a single file.

When the user 112 of the electronic device 102 purchases or otherwise acquires a right to access a particular content item 106, such as through interaction with the content provider 104, the content provider 104 may make the particular content item 106, including the content 118 and the metadata 120, available for delivery to the electronic device 102. The content provider 104 may also add a record to the user's library 114 indicating that the user has the right to access the particular content item 106. Accordingly, in some examples, the library 114 may include a data structure or other collection of data indicating or identifying one or more content items 106 to which the user has acquired a right to access, which may include any of downloading, streaming, or otherwise viewing or consuming the contents thereof. Additionally, in some implementations, the content provider 104 may provide a content item 106 not already received by a user device 102 to an intermediary, such as a wireless network provider (not shown), or the like, that, in turn, provides the content item 106 to a particular electronic device 102. For purposes of this disclosure, "providing" or "making available" by the content provider may include any intermediaries that perform delivery of the content items and associated metadata.

In some examples, the electronic device 102 may include an interaction module 122 and a presentation module 124. In this example, the electronic device 102-1 includes interaction module 122-1 and presentation module 124-1, while the electronic device 102-2 includes interaction module 122-1 and presentation module 124-2. In some cases, the interaction module 122 and the presentation module 124 may be separate modules, applications, or programs. For example, the interaction module 122 may be a web browser that interacts with other entities over a network, and the presentation module 124 may be a media player or reader application that presents the content items 106. However, in other cases, the interaction module 122 and the presentation module 124 may both be part of a single module, application, or program, such as in the case of an application that interacts with the content provider 104, and that also presents content items to a user on a display 126 associated with the electronic device 102. For example, the electronic device 102-1 may have a display 126-1 associated therewith, and the electronic device 102-2 may have a display 126-2 associated therewith.

The content provider 104 may maintain user information 128 that may include a plurality of user accounts 130 corresponding to the users 112, such as a first user account 130-1 corresponding to the first user 112-1 and a second user account 130-2 corresponding to the second user 112-2. Each user account 130 may include user data 132 and library information 134. For example, the first user account 130-1 may include user data 132-1 that contains data relevant to the first user 112-1, and library information 134-1 that includes at least the identity of content items in the first user's library 114-1. Similarly, the second user account 130-2 may include user data 132-2 corresponding to the second user 112-2 and library information 134-2 that includes at least the identity of content items in the second user's library. Examples of user data 132 may include a user's name, an ID number, email address, other contact information, a purchase history, and so forth.

In some examples, the content provider 104 may include a management module 136 that may manage and facilitate a virtual trade, exchange, or swap between the first user's library 114-1 and the second user's library 114-2. For instance, suppose that the first user 112-1 and the second user 112-2 agree to exchange permission to access their libraries, such as for a limited period of time, e.g., 12 hours, 24 hours, two days, or other period of time, or until a certain amount of content has been consumed, or according to any other suitable arrangement. The first user 112-1 and/or the second user 112-2 may interact with the content provider 104 to arrange the exchange, such as using a user interface as discussed additionally below. In response to the users agreeing to the exchange, the management module 136 of the content provider 104 may send library information 138-2 to the first user's device 102-1 and library information 138-1 to the second user's device 102-2. For example, library information 138-2 may include at least a portion of the library information 134-2 of the second user 112-2 maintained in the second user account 130-2. Similarly, the library information 138-1 may include at least a portion of the library information 134-1 of the first user 112-1 maintained in the first user account 130-1.

Upon receiving the library information 138-2, the electronic device 102-1 may present the library information 138-2 on the display 126-1 of the electronic device 102-1. Accordingly, the first user 112-1 may view the library information 138-2 that displays representations of one or more content items 106 contained in the second user's library 114-2. For example, the user may wish to read or otherwise consume one or more of the content items contained in the second user's library 114-2. In some cases, the first user 112-1 may select one or more of the content items in the second user's library 114-2, such as a content item 106*a*, and may download or otherwise access the selected content item 106*a*.

Similarly, the second user 112-2 may view the library information 138-1 that discloses the identity of some or all of the content items 106 included in the first user's library 114-1. Accordingly, the second user 112-2 may select one or more of the content items included in the first user's library 114-1, such as a content item 106*b*, to access, download, stream, view, read, or otherwise consume the content item 106*b*.

The content provider 104 may maintain permission information 140 that identifies content items 118 that each user is permitted to access. For example, the permission information 140 may include the library information 138-1 and 138-2. For instance, the library information 138-1 may list content items from the first user's library that the second user 112-2 has permission to access as a result of the exchange of permission to access. As one example, the library information 138-1 may list all of the content items in the first user's overall library information 134-1, except those content items that the first user has identified as not to be shared, or which are prohibited from being shared by the publisher or content provider. Similarly, the library information 138-2 stored in the permission information 140 and sent to the first user 112-1 may include a list of content items that the first user 112-1 is permitted to access as a result of the exchange of permission to access. Thus, the content provider 104 may determine from the permission information 140 that the first user 112-1 (or a device 102-1 associated with the first user account 130-1) is permitted to access a content item identified in the second library information 138-2 for the duration of the exchange, and is not permitted to access a content item identified in the first library information 138-1. Based on the permission information 140, the management module 136 may instruct the presentation module 124-1 on the first user device 102-1 that content items associated with the library information 138-1 may not be accessed while the exchange of permission to access is in effect.

In addition, in some cases, certain content items may be prohibited from being included in an exchange by the author, the publisher, or the content provider 104. For example, the permission information 140 may identify any such content items that might be included in the library information 138-1, 138-2. The management module 136 may either remove these content items from the library information 138, or in response to a request to access one of these content items, may inform the user that the author/publisher/content provider prohibits swapping of these content items.

Depending on the particular implementation, the users 112-1, 112-2 may be limited as to an amount of content of each other's libraries that they may consume, and or limited by a time duration over which the libraries 114-1, 114-2 may be exchanged. Additionally, in some examples, the users may not be able to access the entire content of any single content item 106 included in the other user's library. For example, the users may be limited to 20 percent, 30 percent, 50 percent, or the like, of any particular content item that they access through the other user's library. Thus, when the user reaches a maximum percentage of a particular content item, the user may be invited to purchase the particular content item for the user's own library, such as at a discount. Similarly, when the library exchange ends, the user may be invited to purchase any content item accessed or browsed during the exchange, also possibly at a discount.

Furthermore, in some examples, the users 112-1, 112-2 may not have access to their own libraries for the duration of the exchange, or may not have access to at least the portions of their libraries that are included in the exchange. For example, the library information 138 may include instructions from the management module 136 to control access to the libraries on each of the devices 102-1, 102-2. For example, the management module 136 may instruct the presentation module 124 on each device 102 to restrict or prohibit access to the content items included in the user's own library 114 while the library exchange is in effect. Furthermore, after the library exchange is terminated, the management module 136 may instruct the interaction module 122 on each device 102 to remove from the device 102 any content items 106 that may have been downloaded as part of the library exchange. Accordingly, the interaction module 122-1 may remove the content item 106a from the first electronic device 102-1 after the exchange terminates. Similarly, the interaction module 122-2 may remove the content item 106b from the second electronic device 102-2 after the exchange terminates.

In addition, it may occur that one of the users wishes to terminate the library exchange early, such as in the case that the user needs access to one of the content items in the user library. Accordingly, a control or interface may be provided to enable the library exchange to be terminated early. For example, suppose the first user terminates the library exchange early on the first device 102-1. In some cases, the second user may continue to access a first user's library on the second device 102-2 until the agreed upon time duration or consumption quantity is reached. In other cases, the access of the second user to the first user's library may also be terminated.

The exchange may be managed on a user account bases, a user bases, and/or a device bases. Thus, in some examples, the exchange maybe controlled based on particular user accounts 130. For example, the first library information 134-1 may be associated with the first user account 130-1 and the second library information 134-2 may be associated with the second user account 130-2. Thus, when the exchange is effected, any device 102-1 or user 112-1 having access to the first user account 130-1 may access content items identified in the second library information 138-2 that is included in the exchange. Likewise, any device 102-2 or any user 112-2 having access to the second user account 130-2 may access the content items identified by the first library information 138-1 that is included in the exchange.

As one example, following the exchange, suppose that the first user 112-1 uses a first user device 102-1, such as an eBook reader, to access a particular content item 118 from the second user's library. Subsequently, suppose that the first user 112-1 wishes to continue to access the content item 118 on a different device 102, such as a smart phone, that is also associated with the first user account 130-1. Upon receiving a request to access the content item 118 from the different device, the content provider 104 may determine from the permission information 140 that the first user account 130-1 has been granted access to the content items 118 identified in the second library information 138-2, and may permit download or other access to the particular content item 118 to the other device of the first user as well. Accordingly, the content provider 104 may allow access to content items in the second library for the duration of the exchange to any device 102 associated with the first user account 130-1. Additionally, in some examples, if multiple users 112 share the first user account 130-1, the multiple users may each be able to access content items identified in the second library information 138-2, while as part of the exchange, being unable to access content items identified in the first library information 138-1.

Alternatively, in other implementations, the exchange may be managed on a per user basis, and may thus be between two users, such that each user is granted access to the other user's library and can access that library through any device of the user. For instance, each user may be specifically identified, such as through a user login or identifier. As one example, suppose that multiple first users have access to the first user account 130-1, and each has a separate ID or login to the first user account 130-1. A particular first user may agree to exchange library access with a particular second user associated with the second user account. Thus, based on a login ID, or other identification technique, the particular first user may access content items identified in the second library information 138-2 using one or more of the first user electronic devices 102-1, and not be able to access content items in the library information 138-1. If there are other users associated with the first user account 130-1, those other users may be excluded from the exchange, and thus, still be able to access content items in the library information 138-1, and not be able to access content items in the second library information 138-2.

As still another alternative, the exchange may be managed on a per device basis, such that the first user 112-1 may use a particular first electronic device 102-1 to access the content items identified in the library information 138-2, and may not be able to access the content items identified in the library information 138-2 through any other devices 102. Additional examples and alternatives are discussed below, and/or will be apparent to those of skill in the art in light of the disclosure herein.

Example Interfaces

Figure 2:
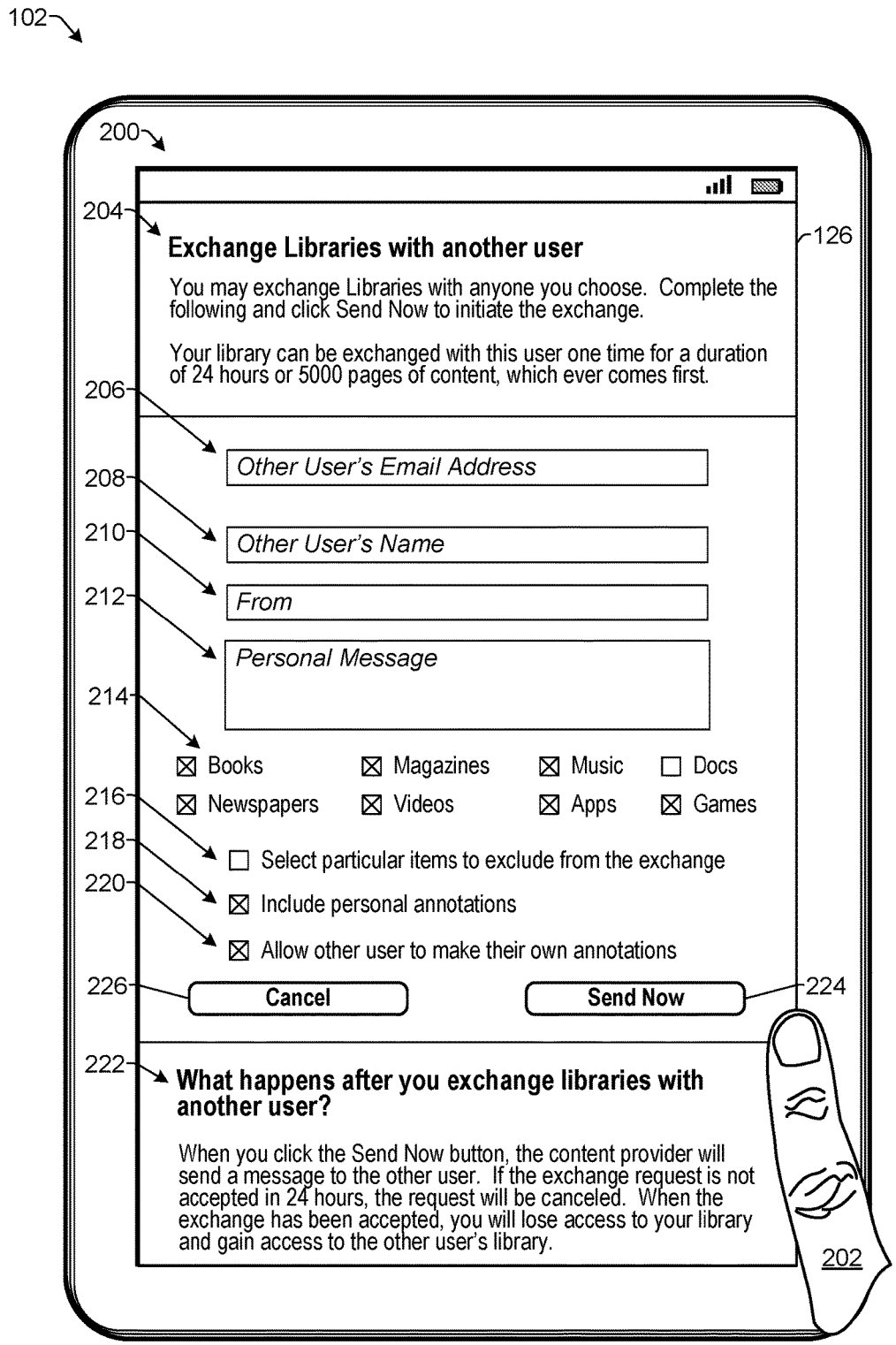
FIG. 2 illustrates an example user interface for sharing digital libraries according to some implementations.

FIG. 2 illustrates an example of a user interface 200 that may be presented on the electronic device 102 to enable sharing or exchanging of libraries according to some implementations. In the example of FIG. 2, the electronic device 102 includes the display 126 for displaying the interface 200 to the user. In some examples, the display 126 may be a touchscreen type of display configured with a sensor to sense a touch input received from an input effecter 202, such as a finger of a user, a stylus, or other pointer. Thus, the touchscreen may receive one or more touch inputs, interactions, selections of displayed objects, page swipes and so forth.

In other examples, the display 126 may be non-touch sensitive. Accordingly, in addition to, or as an alternative to, a touch sensitive display, the electronic device 102 may include various external controls and input devices (not shown in FIG. 2). For example, some implementations of the electronic device 102 may include a virtual or physical keyboard, a mouse, a pointing stick, a touchpad, a trackball, a joystick, a remote control, buttons and/or various other controls for performing various desired inputs and interactions with the electronic device 102 and content item 106 displayed on the display 126. Additionally, in some implementations, one or more voice commands may be used to control or interact with the content items and interfaces herein, such as for selection of objects and performing other functions. Further, in some implementations, a user's eye position, gaze or point of focus may be detected to serve as inputs or commands. Thus, implementations herein are not limited to any type of input devices, techniques, or controls.

In the example of FIG. 2, suppose that a user of the electronic device 102 wishes to exchange libraries with another user. For instance, suppose that the first user 112-1 of FIG. 1 wishes to exchange libraries for a day with the second user 112-2. Accordingly, the first user 112-1 may access the interface 200 to initiate exchanging of libraries with the second user 112-2. In this example, the interface 200 includes instructions 204 that provide information as to how to exchange libraries with another user. The instructions 204 may tell the user of the types of information to provide in the interface 200, and may further set forth one or more rules or constraints that will apply to exchanging libraries with another user. For example, the content provider and/or publishers may impose limits on the duration for which a library may be exchanged and/or may limit the amount of content that may be consumed while a library is exchanged with another library.

As one example, a limit may be imposed on the maximum duration of the exchange, such as for a duration of 24 hours, 12 hours, two days, or other set period of time. Alternatively, in other examples, there may be no set period of time and, for example, the users may pay a fee to the content provider to allow the exchanging of the libraries, or the period of time may be set according to various different fees, such as by paying additional fees to extend the exchange. As another example, the exchange may remain in effect until one or both of the users has consumed a specified amount of content, such as a certain number of pages viewed by either of the users, e.g., 500 pages of content, 1000 pages of content, a total accumulated range of locations of one or more content items viewed by the user (in the case that the content items use invariant locations rather than page numbers), a certain other quantity of content, such as 5 MB, 100 MB, or the like, depending on the type of content items 106 included in the library exchange, any combination of the foregoing, or any of various other limiting factors. Further, in other implementations, the users may be permitted to access a sample quantity of each content item identified in the library information of the other user. For instance, the user may be permitted to sample up to a certain percentage of content of each content item listed in the library information of the other user, such as 5%, 10%, etc.

As another example, the exchange may remain in effect while both users are detected to be within a certain proximity of one another. For instance, the exchange may be permitted while both users are using the same wireless access point, or are otherwise detected to be in the same location or within a vicinity of one another. The exchange may terminate when a device of one of the users is detected to be no longer within a certain proximity to the device of the other user. Additionally, or alternatively, there may be restrictions on the type of content that may be included in an exchange of libraries. As one example, eBooks and other textual items may be permitted to be included, but other types of content items, such as songs or videos may be restricted from being included. Further, certain content items associated with particular publishers, authors, or the like, may be prohibited from being included in an exchange, such as due to various restrictions imposed by or on the publishers or authors. Other variations will also be apparent to those of skill in the art having the benefit of the disclosure herein.

To enable exchanging of access to libraries between two users or user accounts, the interface 200 collects information from an originating first user regarding the other user that is the intended target of an exchange request. For example, the interface 200 may obtain an identifier of the other user that is the intended target of the exchange request, such as the other user's e-mail address 206 or other identifier such as a user ID, an account ID, or the like, that may be used to positively identify a particular recipient. The interface 200 may also obtain the other user's name 208, which in some cases may be used to verify that the exchange request is directed to the correct targeted recipient. The interface 200 may also obtain the name of the originating user that is submitting the request, as indicated at 210, and may allow the originating user to include a personal message, as indicated at 212, such as a message as to why the user is requesting the exchange, a greeting from the user, or the like.

Furthermore, in this example, the interface 200 may include a plurality of filters 214 or limiters that may specify the type of content that may be shared during the exchange of the user's library. For example, the user may choose to share only books, while not sharing newspapers, magazines, videos, music, applications, games or personal documents. Accordingly, the user may use the filters 214 to select which types of content items to share or not share from the user's library. Additionally, as indicated at 216, the user may be provided the opportunity to select particular content items to exclude from the exchange, such as a content item that the user is currently reading, or the like.

Furthermore, some types of content items may be automatically unselected or restricted from being included when the interface 200 is initially presented. For example, the personal documents of a user may be automatically unselected, while still giving the user the option to select these types of content items. In addition, as mentioned above, publishers, authors, or the content provider may restrict certain content items from being shared with a library share or exchange. For example, if a user in a first country wishes to share or exchange libraries with a user in a second country, certain content items may be restricted based on territorial agreements with various publishers, copyright laws of the one of the countries, content laws of one of the countries, and so forth. As another example, the content provider or the user may establish preset defaults as to what type of content items may be shared using a library exchange. For example, for copyright or licensing purposes, the content provider 104 may limit exchanging of libraries to content items that are textual content items, rather than multimedia content items applications, or the like. Thus, as discussed above, the permission information 140 may be used by the content provider to exclude automatically from any exchange certain content items that are prohibited from being included in an exchange. Additionally, the user may establish a default to not share certain types of content from the user's library, such as the user's personal documents, adult content, private content, or the like.

In addition, the user may have the option, as indicated at 218, to decide whether personal annotations will be included with the content items in the user's library during the swap. For example, a user may have made highlights, notes, bookmarks, or other annotations to one or more of the content items in the user's library. Accordingly, the user may include these annotations with the swap, or may unselect this option 218 to have these personal annotations not included with the swap. Additionally, as indicated at 220, the user also may have the option as to whether to allow the recipient to make their own annotations to content items in the user's library. Thus, in some instances, the recipient second user may make annotations to one or more of the content items of the first user. In some examples, these annotations by the second user may be stored separately from the library of the first user, such that if the second user subsequently acquires one of the content items, the annotations made by the second user to the content item in the first user's library may be transferred to the second user's instance of the content item.

In addition, the interface 200 may include additional instructions 222 describing to the user what will happen after the user initiates the swap of libraries with another user. For example, the instructions may inform the user that after the user initiates the swap, the content provider will send a message to the target recipient, i.e., the second user in this example. Further, the instructions 222 may inform the user that if the swap is not accepted within a period of time, the request may be canceled. The instructions 222 may further inform the user that when the swap has been accepted, the user may lose access to some or all of the user's own library when the user gains access to the recipient's library.

When the first user has provided the requested information and completed all the selections in the interface 200, the user may select a "send now" button 224 to send the swap request to the intended recipient. Alternatively, if the user decides not to swap libraries, the user may select a cancel button 226. Upon selecting the send now button 224, the information from the interface 200 may be sent to the content provider which, in turn, will send a message to the intended recipient, i.e., the second user. For example, the message to the intended recipient may inform the recipient second user that the first user wishes to swap libraries with the second user, and may inform the second user that the invitation may be accepted within a predetermined period of time or the invitation will be canceled. The message may further inform the second user of any limitations that will be applied upon accepting the request, such as losing access to the second user's own library. In addition, the message may present an interface similar to the interface 200 to enable the second user to filter the types of content items that are included in the swap, select particular content items to exclude, and/or to select preferences as to whether personal annotations are to be included and/or allowed to be made during the library exchange.

Figure 3:
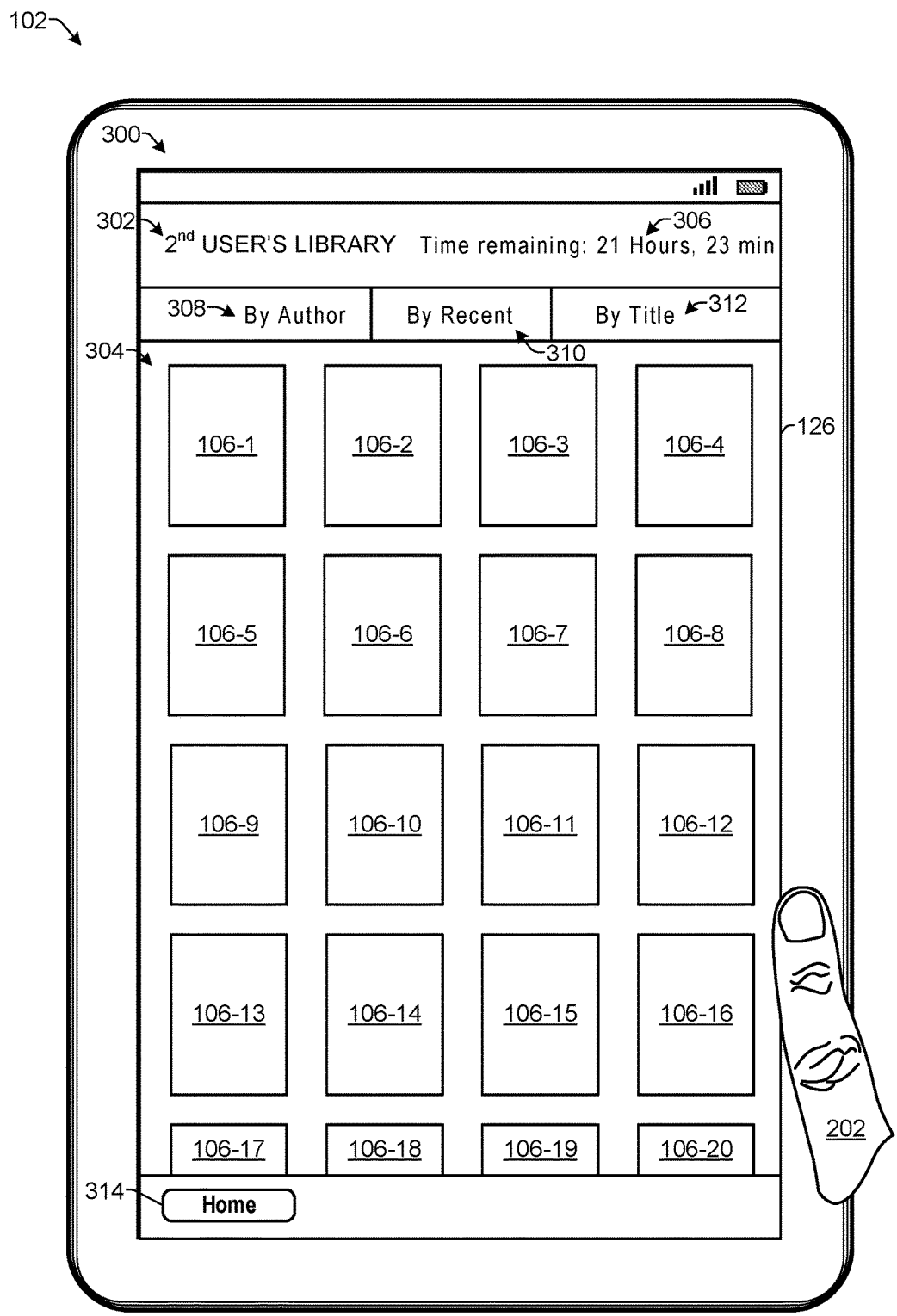
FIG. 3 illustrates an example user interface for accessing a shared digital library according to some implementations.

FIG. 3 further illustrates an example library interface 300 that may be presented on the electronic device 102 according to some implementations. In this example, suppose that the second user accepted the first user's request to swap libraries. The first user 112-1 may be presented with a message from the content provider 104 that the second user's library is now available for access. Accordingly, the first user may receive the second user's library information, as discussed above, and may be presented with the library interface 300. For example, the library interface 300 may indicate at 302 that the second user's library has been accessed, and may display at least a portion of the second user's library 114-2. For example, the library interface 300 may display a plurality of representations 304 of content items, such as for content items 106-1, 106-2 . . . , 106-20, or more, which may be a view of the second user's library 114-2 that the second user 112-2 would normally have when viewing the second user's library 114-2. When there are more representations 304 than can be displayed on the display 126 at any one time, the user may be able to scroll up and down, and/or left and right through the content item representations 304 to select a one or more particular content item representations 304, such as to view more information about the content item or to download the content item to the user's device 102.

Furthermore, the interface 300 may include an indicator 306 that may indicate that the first user has a prescribed or set period of time in which to access the second user's library. In some cases, the indicator 306 may provide a countdown of time remaining. Alternatively, the indicator 306 may set forth a total amount of content that may be consumed from the second user's library, and may provide a countdown of the amount of content remaining that is permitted to be accessed. Still alternatively, the indicator 306 may specify other limitations to which the access to the second user's library is subject.

In addition, the interface 300 may include various controls, such as controls which may enable the user to organize and/or more easily browse through the content item representations 304, such as by arranging the content item representations 304 according to author, as indicated at 308, arranging the representations 304 according to an order in which they have been recently accessed, as indicated at 310, or by arranging the representations 304 in order according to title as indicated at 312, to provide a few examples. Other examples or options for arranging the representations 304 may include according to bestsellers, price, reviews of other users, most often accessed, or the like. In addition, the library interface 300 may include a home button 314 that the user may select to close the library interface 300, such as for accessing a different interface on the device 102, for terminating the swap early, or the like.

The user may select one or more of the representations 304 to download or otherwise access and consume the corresponding content item 106. For example, the user may download any of the content items included in the library to the user's device and may access these content items for the duration of the swap, such as until the time limit is reached or until a maximum allowed quantity of consumed content is reached. Additionally, in some examples, rather than immediately downloading a selected content item, the interface 300 may first present a synopsis, description and/or reviews of the content item, such as in a popup menu. For instance, the description information may be obtained from the content provider 104 by the interaction module 122 upon detecting that the user has tapped on or otherwise selected one of the content item representations 304 in the interface 300, or the description information for each representation 304 may be included with the library information 138.

As one example, the management module 136 may monitor the length of time that the swap has continued, and may send instructions to the electronic devices 102-1, 102-2 when the allowed time for the swap has expired to terminate the library exchange. In response, as one example, the interaction module 122 on each device 102 may delete any content items 106 that were downloaded as a result of the library swap and further may offer the opportunity for the user to purchase any of the content items that were downloaded during the swap or other content items included in the other user's library. For example, the interaction module 122 may present an interface that identifies any content items browsed or downloaded by the user and may further offer these content items for sale to the user.

Additionally, in other examples, the interaction module 122 on the electronic device 102 may monitor the length of time of the swap or the amount of content consumed, and may terminate the swap independently of the management module 136. For instance, the interaction module 122 may determine that the swap should be terminated, and may warn the user of the impending termination, such as by providing a countdown. To terminate the swap, the interaction module 122 and may remove the library information 138 of the other user from the device 102, delete any content items 106 downloaded during the swap, and instruct the presentation module 124 to provide the user with access to the user's own library on the device 102. The interaction module 122 may further inquire as to whether the user would like to purchase or otherwise acquire access to any of the content items browsed or downloaded during the swap.

Example Metadata

Figure 4:
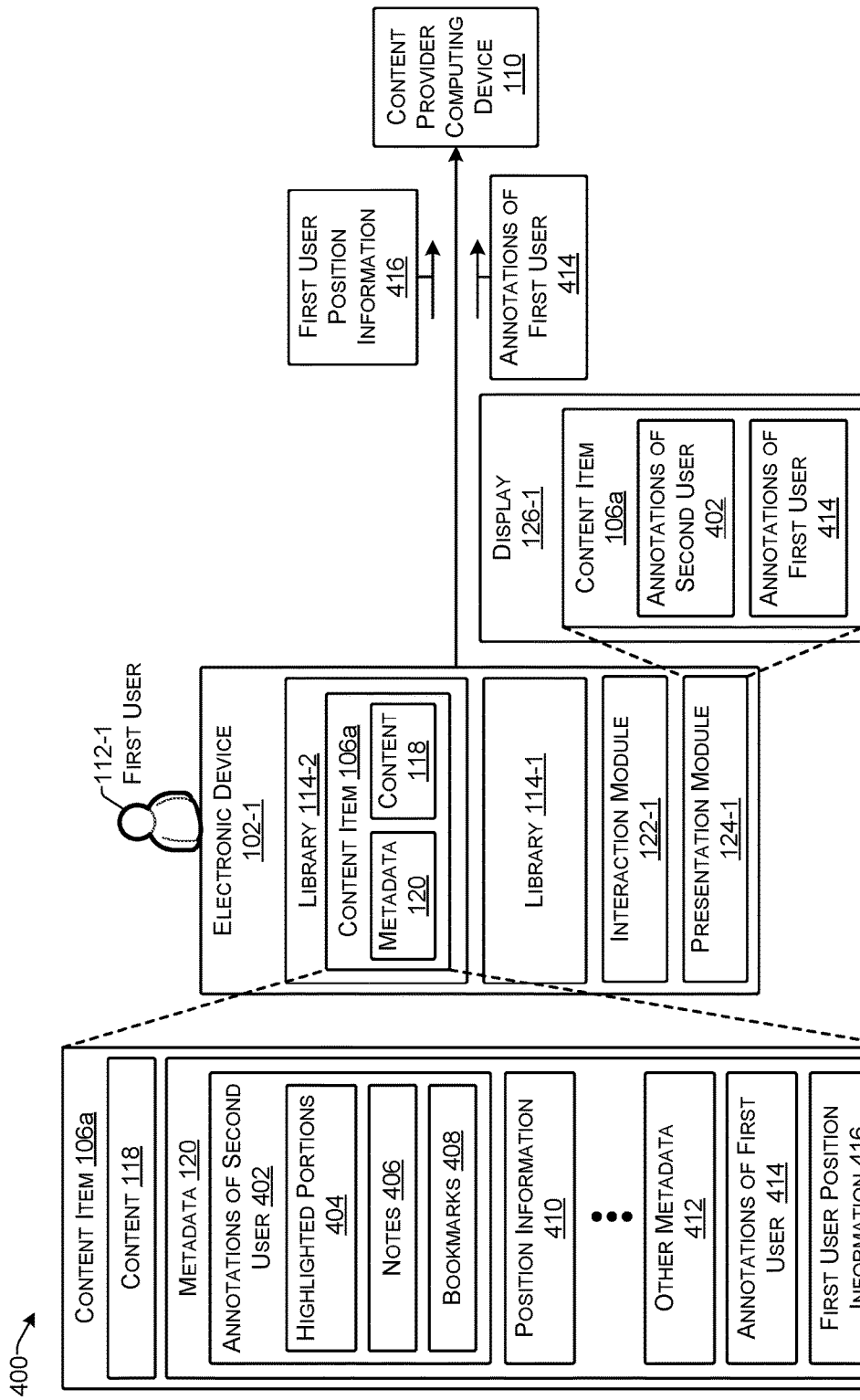
FIG. 4 illustrates an example framework for sharing metadata in connection with sharing a digital library according to some implementations.

FIG. 4 illustrates an example metadata framework 400 according to some implementations. In this example, the electronic device 102-1 associated with the first user 112-1 received the content item 106a that the first user 112-1 downloaded through the library 114-2 of the second user 112-2. For example, the electronic device 102-1 may receive in the library information 138-2, and may use this information to generate a library interface 300 as discussed above with respect to FIG. 3, thereby providing the first user 112-1 with access to the second user's library 114-2.

In the example described above, the first user 112-1 selected the content item 106a from the library 114-2 of the second user 112-2 to download and read or otherwise consume on the electronic device 102-1. In addition, suppose that the second user 112-2, when accepting the invitation to swap libraries, agreed to provide the second user's personal annotations 402 with the swap. Consequently, the metadata 120 corresponding to the content item 106a may include the annotations 402 of the second user for the particular content item 106a. For example, the content provider computing device 110 may obtain the annotations 402 from the second user data 132-2 associated with the account 130-2 of the second user, as illustrated above with respect to FIG. 1, and may include this information in the metadata 120 included with the content item 106a provided to the first user 112-1.

The annotations 402 of the second user may include, for example, information to related to highlighted portions 404, corresponding to any portions of the content item 106a that the second user has highlighted; notes 406 that have been added to the content item 106a by the second user; or bookmarks 408 added to the content item 106a by the second user. The metadata 120 may further include position information 410 that may indicate a current position or furthest position that the second user has reached in the content item 106a. Additionally, the metadata 120 may include other metadata 412, such as language information for the content item 106a, information relating to parts of speech included in the content item 106a, and various other types of metadata.

In this example, the first user 112-1 may access the content item 106a on the electronic device 102-1 by causing the presentation module 124 to display the content item 106a on the display 126-1. When viewing, reading, or otherwise consuming the content item 106a, the first user 112-1 may be able to see any annotations 402 of the second user 112-2. Furthermore, if the second user 112-2 selected the option to allow the first user 112-1 to annotate content items in the second user's library, the first user 112-1 may also make annotations 414 to the content item 106a, which may be stored with the metadata 120 of the content item 106a. Further, any annotations 414 made by the first user 112-1, as well as position information 416 regarding any portions of the content item 106a read or otherwise consumed by the first user 112-1, the farthest point reached in the content item 106a, and so forth, may also be sent back to the content provider computing device 110 by the electronic device 102-1 and stored with the user data 132-1 of the first user 112-1.

Subsequently, after the first user 112-1 and second user 112-2 swap back to their original libraries, if the first user 112-1 decides to acquire the content item 106a for the first user's library 114-1, the annotations 414 and position information 416 for the first user 112-1 may be applied to the newly acquired content item 106a as if the first user 112-1 had accessed the content item 106a from the first user's library rather than from the second user's library 114-2. In addition, the annotations 414 of the first user and/or the position information 416 of the first user may remain with the metadata 120 of the content item 106a in the library 114-2 of the second user. For example, the second user may be able to see any annotations 414 made by the first user 112-1 during the library swap.

Example User Interfaces

Figure 5:
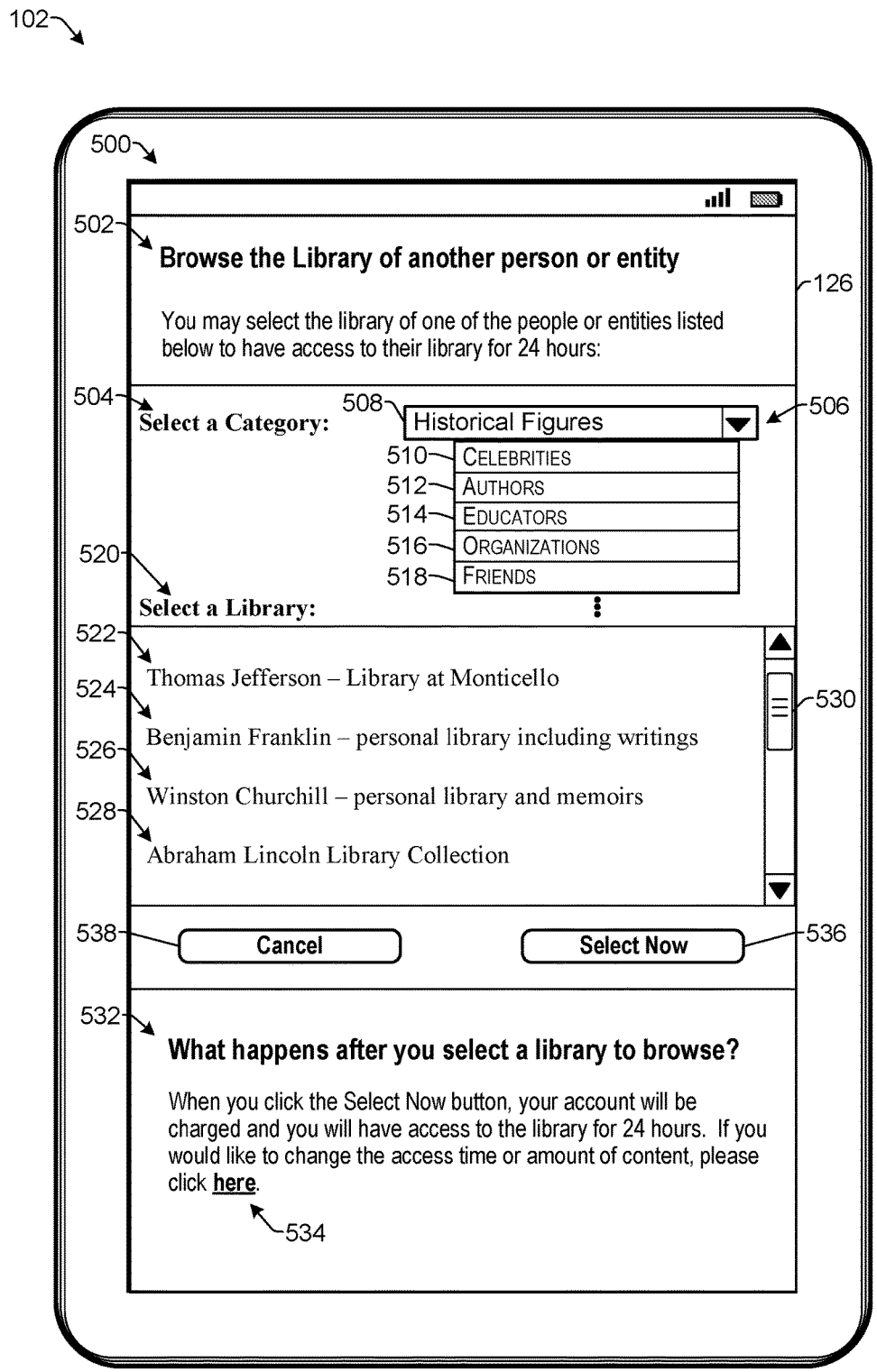
FIG. 5 illustrates an example user interface for accessing the digital library of another person or entity according to some implementations.

FIG. 5 illustrates an example user interface 500 for selecting a library to access according to some implementations. In this example, rather than exchanging libraries with another user, the user may access, browse and use a library of another person or entity. Accordingly, the interface 500 may be presented to the user to enable the user to select a library to access the content items thereof. For example, the user may be permitted to access a selected library for a fee, or as part of a promotion for a particular content item, author, publisher, or content provider. For instance, the user may access the selected library for a specified period of time, or until a specified amount of content has been consumed from the library, or the like. As another example, the user may be permitted to access a sample amount of content of each content item listed in the library of the other person or entity. For example, the user may be able to access 5%, 10%, or the like, of content of each content item.

In the illustrated example, the interface 500 provides instructions 502 to inform the user that the libraries of one or more of the listed entities or people may be accessed for a specified period of time, or the like. The interface further provides an area 504 to enable the user to select a category of person or entity. For instance, the interface 500 may provide a drop-down menu 506 that enables the user to select a category such as historical figures 508, celebrities 510, authors 512, educators 514, organizations 516 and friends 518, to name a few examples. For instance, with respect to historical figures, the content provider may assemble a library profile for the historical figures that may include books or other items that were included in the libraries of the historical figures.

Furthermore, living celebrities, authors, educators, or other selectable people, may be provided an incentive to allow other users to access their personal libraries. For example, the selectable people may use an interface similar to interface 200 discussed above when selecting items from their personal library that may be viewed by other users. In the case of such selectable people, access to their own personal libraries would not be lost by providing access to their libraries to other users. In some cases, selectable people may receive a financial incentive to allow other users to access their libraries, or may participate in allowing access as part of a promotion of a content item or other activity or event. For instance, a selectable person may be able to view or be notified of the number of other users that have accessed their library, the number of sales that have resulted from such accesses and/or may be provided financial compensation based on the number of sales resulting from other users accessing their library. For example, the celebrity may provide recommendations for particular content items in their libraries, may provide reviews of particular content items, or the like, that may be viewed by other users that access the celebrity's library.

Similarly, organizations, such as museums, corporations, or the like, may also provide access to their libraries or to assembled libraries that may be a collection of content items that have a common connection, theme, subject, or the like. Thus, in some examples, an organization or the content provider may assemble one or more library profiles to enable users to access libraries that represent collections of content items having some commonality that might be of interest to at least some users.

Furthermore, one or more friends of a user may also provide access to their libraries. For example, users may associate with one another, such as by joining a group, a friend list, or the like, that is communicated to the content provider 104. For example, by joining a particular group, such as a book club or the like, the members of the club may agree to share temporary access to their libraries with other members of the group.

When the user has selected a desired category at 504, the user may be presented with a list of libraries from the selected category, as indicated at 520. In the illustrated example, the user may select from the library of Thomas Jefferson 522, Benjamin Franklin 524, Winston Churchill 526, or Abraham Lincoln 528, and may further scroll down to see additional available selections, such as by using a scroll bar 530. The interface 500 may include additional instructions 532 that described to the user what happens after the user selects a library to browse. For example, the instructions may indicate that when the user has selected a library, the user's account is charged and the user will have access to the selected library for a specified period of time. Alternatively, as mentioned above, the user may have access up to a specified consumption quantity, or the like. Furthermore, as indicated at 534, the user may have the opportunity to change the amount of time and or the total amount of content able to be accessed, such as by paying an additional fee. When the user has selected a desired library, the user may choose a "select now" button 536 to gain access to the selected library. On the other hand, if the user decides not to access a particular library, the user may choice a cancel button 538.

When the user accesses a selected library, the user may be presented with a library interface 300 similar to that described above with respect to FIG. 3. For example, the user may browse through content item representations of content items contained in the selected library and choose one or more content items to download to the user's device with which to view and/or interact. The user may view any annotations made in the content items, such as may be made by a celebrity, a museum curator, and so forth. In addition, annotations made by the user and/or position information for the user may be stored in the user data of the user by the content provider in a manner similar to that described above with respect to FIG. 4 for any content items accessed. In some examples, the user may be required to pay a fee for accessing the library of another, or may be provided with advertisement content to be viewed as part of receiving access to the library of another. Additionally, in some cases, the user may be offered a discount to purchase any items included in the library of another that the user has accessed.

Figure 6:
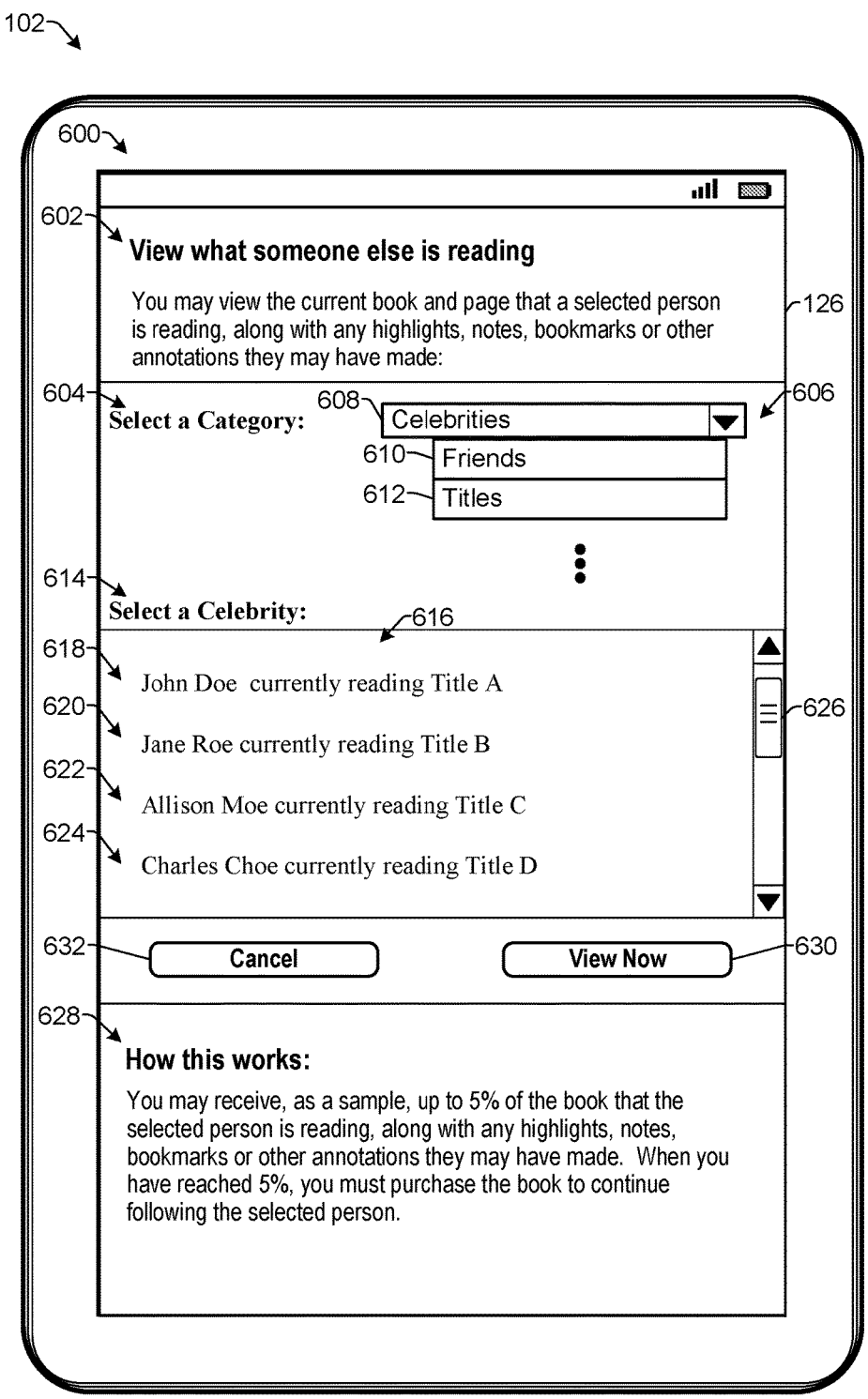
FIG. 6 illustrates an example interface for following the content item consumption of another person according to some implementations.

FIG. 6 illustrates an example user interface 600 for selecting a particular person to view the consumption information thereof according to some implementations. In this example, a user may be able to view what another person, such as a celebrity, author, friend, or other selectable person is currently reading. The interface 600 may provide instructions 602 that inform the user that the user may view the current title and page of a content item that a selectable person is currently reading. Additionally, in some examples, the user may be able to view any annotations such as highlights, notes, bookmarks, comments, recommendations, reviews, or other information entered by the selected person into the content item 106.

As indicated at 604, the user may select the category, such by using a drop-down menu 606, or other functionality. In this example, the user may select a category such as celebrities 608, friends 610, or titles 612, to name a few possible categories. When the user has selected a category, then as indicated at 614, the user may select a particular person from a presented list 616 of names and the titles that the listed people are currently reading, such as John Doe 618, currently reading Title A; Jane Roe 620, currently reading Title B; Allison Moe 622, currently reading Title C; and Charles Choe 624, currently reading Title D. The user may further use a scrollbar 626, or the like, to view additional names and titles available for selection in the selected category.

Further, in some examples, the user may make a selection according to title 612, rather than a selectable person. For example, the user may select a particular title of a book in which the user is interested, currently reading, or has already read, and may view the celebrity's reading progress, notes, comments, highlights, or the like.

The interface 600 may further provide additional instructions 628 that provide information as to how the viewing of the selected person's current book may proceed. As one example, the user may be able to sample up to a certain percentage of the book that the selected person is currently reading. In some cases, the user may also be able to view any annotations, such as highlights, notes, reviews, recommendations, etc. that the selected person has made to the content item. When the user has consumed the allowed percentage of content of the content item, the user may be invited to purchase the content item to continue viewing additional portions of the content item. As an alternative to being limited to a percentage of the content item, the user may be provided access to the particular content item for a limited period of time, after the expiration of which, purchase or additional payment may be required to view additional portions of the content item 106, such as to follow the selected person and view any annotations made by the selected person.

When the user has selected one of the people from the list 616, the user may select a view now button 630 and may be presented with the current page that the selected person is reading. Alternatively, if the user decides not to view what someone else is reading, the user may select a cancel button 632.

Example Architecture

Figure 7:
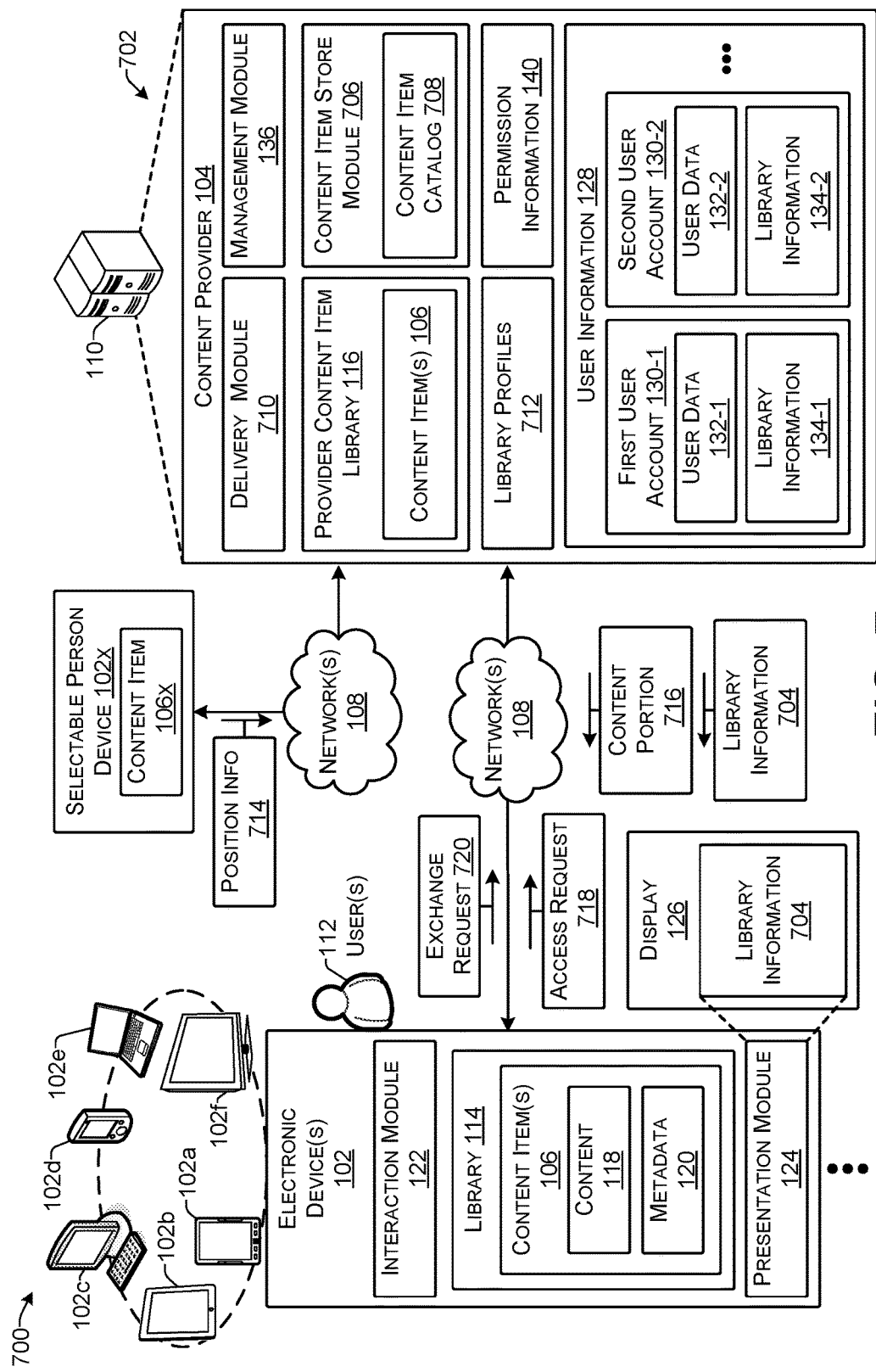
FIG. 7 illustrates an example architecture of a system for enabling sharing of digital libraries and content items according to some implementations.

FIG. 7 illustrates an example architecture of a system 700 to enable sharing of libraries and/or viewing of content items of others according to some implementations. In some examples, a digital library may be accessed by one or more electronic devices 102 capable of displaying, rendering or otherwise presenting content items 106, such as on the associated display 126. Some examples of the electronic device(s) 102 may include digital media devices and eBook readers 102a; tablet computing devices 102b; desktop, terminal and workstation computing devices 102c; smart phones and mobile devices 102d; laptop and netbook computing devices 102e; televisions, gaming systems, and home and automotive electronic devices 102f; and any other device capable of accessing and rendering or playing content items, online content, mobile content, textual content, multimedia content, or the like.

In the illustrated example, the content provider 104 may maintain an online location or site 702, such as a merchant website, an e-commerce site, or other functionality that offers one or more content items 106 to the public. For example, the content provider site 702 may be hosted on one or more of the computing devices 110. In some cases, the host computing devices 110 may be one or more web servers located at a data center, server farm, or other single physical location. In other cases, the content provider site 702 or portions thereof may be located in diverse locations that are physically remote from one another. Further, in some implementations, the content provider site 702 may be a group of websites, data stores, services, and the like, hosted on a plurality of different host computing devices 110 in a plurality of diverse locations, or hosted by one or more host computing devices 110 at a single location.

In some implementations, the content provider site 702 may offer content items 106 to the public through an online presence accessible by a web browser or other application. In some examples, the content provider site 702 alternatively, or additionally, may provide content items 106 through an online or mobile application executing on the electronic device 102. For instance, an application on the electronic device 102, which may include the interaction module 122, may connect to or obtain content from the content provider site 702 to enable the purchase or management of one or more content items 106, and the like. Thus, the content provider site 702 may enable the electronic device 102 to access content items 106 through an online or mobile application executing on a mobile electronic device 102, such as an eBook reader, smart phone, tablet computing device, augmented reality device, or the like. Accordingly, the content provider site 702 is not limited to a website accessed by a browser, but may encompass other technologies for marketing and providing content items 106, such as through in-application shopping, and the like.

The electronic device 102 may include the interaction module 122, which in some instances may be an application, such as a browser, mobile application, or other module or computer program configured to receive web content, webviews, online content, or the like, for accessing and interacting with one or more modules of the content provider 104. For example, the interaction module 122 may enable a user 112 to shop for content items at the content provider site 702 and access or receive content items 106 from the content provider site 702, such as by downloading through the network 108. Additionally, while FIG. 7 illustrates an example user 112 and electronic device 102, the described techniques can of course be used with any number of users 112 and electronic devices 102. In addition, a single user 112 may use a plurality of electronic devices 102.

The electronic device 102 may include the content item presentation module 124 and one or more content items 106. In some implementations, the presentation module 124 and the interaction module 122 may be separate modules or applications. In other implementations, the presentation module 124 and the interaction module 122 may both be part of the same application or computer program for accessing and presenting content on the electronic device 102. In yet other implementations, the presentation module 124 and the interaction module 122 may represent different functionalities of the same module.

In some examples, the presentation module 124 may present library information 704 on the display 126, such as in the interface 300 described above. In some examples, the display 126 may be part of the electronic device 102, and/or unitary with the electronic device 102. In other examples, the display 126 may be separate from the electronic device 102 and connected to or coupled with the electronic device 102. The presentation module 124 may further display content 118 of a content item selected via the library information 704. In some examples, the library information 704 may correspond to the library information 138 discussed above for a library swap, while in other examples, the library information 704 may be the library information of a selectable person or entity, as discussed above with respect to FIG. 5.

The presentation module 124 or the interaction module 122 may present one or more of the interfaces discussed above for exchanging libraries, accessing selected libraries, or viewing content items being read by others. Thus, the presentation module 124 or the interaction module 122 may generate and display the interfaces 200, 300, 500 and/or 600. For instance, in some cases, the interfaces 200, 300, 500 and/or 600 may be generated using any of HTML (hypertext markup language), JavaScript®, CSS (Cascading Style Sheets), widgets, or any combination thereof, or any other suitable technology or graphics rendering software.

In some implementations, each content item 106 may include content 118, such as text, images, audio, video, or the like, and may further include the metadata 120 that is associated with the content item content 118. For example, the content provider 104, the author, the publisher, etc., may provide or may generate at least a portion of the metadata 120 for a corresponding content item 106. In addition, in some cases, the metadata 120 may include annotations of a user or other information related to user interaction with a content item.

As discussed above, the user information 128 may include a plurality of user accounts 130 for a respective plurality of users 112 of the content provider site 702. For example, the user information 128 may include a user account 130 for each user including user data 132 for identifying and interacting with the user, such as name, email address, mailing address, telephone number, user identification (ID) number, user purchase history (e.g., content items 106 acquired by the user), usage and interaction information, and so forth. The user account 130 may further include library information 134 for each user.

The content provider site 702 may include a content item store module 706 that may provide or may access a content item catalog 708. For example, the content item store module 706 may present the content item catalog 708 to the interaction module 122 of an electronic device 102 that accesses the content provider site 702 to shop for a content item 106. The content item catalog 708 may include searchable and/or browsable listings and descriptions of content items 106 available from the content provider site 702. The content item store module 706 may communicate with the interaction module 122 on the electronic device 102 to enable the user 112 to locate and acquire a content item 106 from the content provider site 702.

The content provider site 702 may further include a delivery module 710 that may deliver (or make available for delivery) a content item 106 to the electronic device 102 and/or the user 112. For example, in some instances, the delivery module 710 may facilitate the download of a content item 106 to the electronic device 102 over the network(s) 108. In other instances, the delivery module 710 may also expose programmatic interfaces or APIs (application programming interfaces) that electronic devices 102 can use to obtain digital content items 106 and related services.

Furthermore, in some implementations, the delivery module 710 may identify library information 704 to send to the electronic device 102. For example, the library information 704 may include at least a partial listing of content items maintained in a digital library of a particular user, selectable person, or in a particular library profile 712. For example, in the case of a library swap, the library information 704 may include the library contents included in the swap. In the case of a user accessing the library of a selectable person, the library information may similarly include the library content of the selected person. In the case that the user desires to access a library of a historical figure, an organization, or the like, the library information 704 may be obtained from a library profile 712 corresponding to the particular historical figure or organization. For example, a library profile 712 may be a generally permanent listing of content items that are included in the library for the specified entity, and may be created by historians in the case of historical figures, by museum curators in the case of museum collections, or by organization members in the case of other types of organizations or entities.

Additionally, in some cases, the delivery module 710 may assist in synchronizing the content of multiple devices 102 of a user or a user account 130, such as for delivering and synchronizing multiple instances of a content item 106 on multiple devices 102 associated with a single account 130. In some examples, the electronic device 102 may send position information 714 to the content provider 104 for inclusion with other information in the user's account 130. For instance, the position information 714 may correspond to the position information 416 discussed above, and may include information indicating a current position or point of progress for each content item 106 accessed by the user 112. The position information 714 associated with a particular user account 130 may be used to synchronize the content item 106 with other instances of a particular content item on other devices 102 associated with the particular user's account. Accordingly, the delivery module 710 of the content provider may send synchronizing information that may include the position information and any annotations to the other device(s) 102 of the particular user so that when the user accesses the content item 106 on the other device, the other device may present the content item 106 in the same position as when the user last accessed it on the first user device, along with any added annotations.

Additionally, in the case that a user 112 desires to view the current reading progress of a selected person, such as a celebrity, the position information 714 received from a device 102x of the selected person may be used to determine a content portion 716 to provide to the user. For example, suppose the user submits an access request 718 that requests viewing of a portion of a content item 106x that the selected person is currently reading. The management module 136 may refer to the user data 132 for the selected person to determine the current position information 714 of the selected person in the content item 106x. The management module 136 may then determine a content portion 716 of the content item 106x corresponding to the current position of the selected person in the content item 106x. The delivery module 710 may make this content portion 716 available for delivery to the electronic device 102 of the user 112. As mentioned above, in some examples, the amount of content delivered to the user's device 102 may be limited, such as to a certain percentage of the total amount of content of the content item 106x. Further, after the allowed amount of content has been received by the user 112, the user may be invited to purchase full access to the content item 106x. Additionally, in some examples, the content portion 716 made available to the electronic device 102 of the user 112 may include annotations made by the selected person to the content item 106x, which may be sent to the content provider with the position information 714, and which may be stored by the content provider 104 with the user data 132 for the selected person.

The content provider site 702 may also include or may access a provider content item library 116. For example, the provider content item library 116 may include a plurality of content items 106 that the content provider 104 has available for access by electronic devices 102, such as by purchase through the content items catalog 708. Each content item 106 in the provider content item library 116 may include both content 118 and metadata 120 corresponding to the content. In some examples, the content item library 116 may contain hundreds of thousands of unique content items 106, including a variety of eBooks, such as fiction, non-fiction, etc., and various other types of content items, examples of which have been enumerated above.

The content provider site 702 may further include the management module 136 that may be employed in some implementations for managing swapping of libraries, managing access to libraries of others and/or enabling viewing of portions of content items that other selectable people are currently reading, as discussed above. In some examples, when the management module 136 receives an exchange request 720, the management module 136 may forward the request to the intended recipient. Upon acceptance of the library swap by the intended recipient, the management module 136 may manage the library swap, such as by, determining when a predetermined period of time has elapsed for terminating the library swap, or determining when a predetermined amount of content has been consumed by one or both of the users that are party to the library swap. Furthermore, the management module 136 may send an instruction to at least one of the interaction module 122 or the presentation module 124 to prevent or limit access of a user that is party to a library swap to the user's own library 114 for the duration of the swap. The management module 136 may similarly manage a user's access to the library of a selectable person, such as by monitoring the amount of time of access, the amount of content consumed, removal of content items from the user's device after the access has ended, or the like. In addition, the management module 136 may manage a user's access to a content item that a selectable person is currently consuming. For example, the management module 136 may monitor the amount of sample content portions 716 that the user receives in connection with the content item of the selected person, and may provide an offer to sell the content item to the user upon the determining that the user has consumed the maximum permitted amount of content. Numerous other variations will be apparent to those of skill in the art in light of the disclosure herein.

Example Electronic Device

Figure 8:
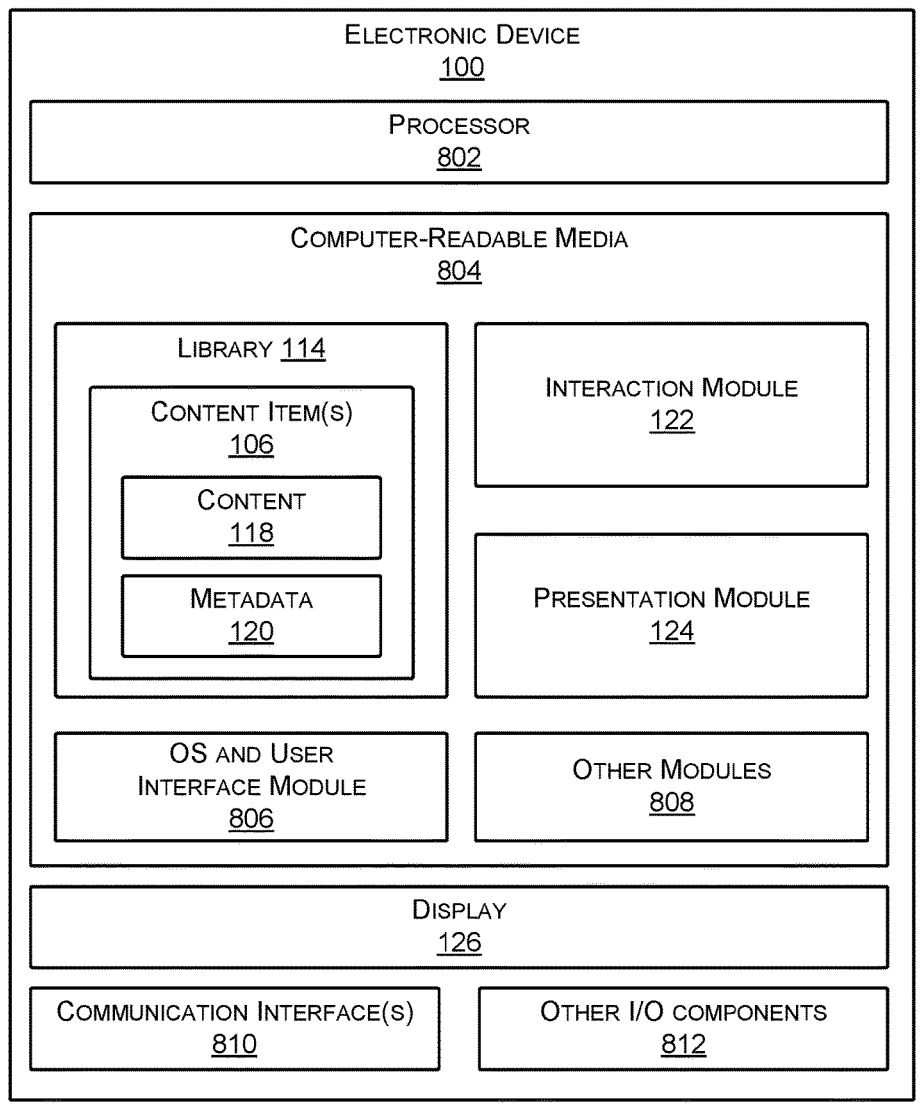
FIG. 8 illustrates select components of an example electronic device according to some implementations.

FIG. 8 illustrates select example components of the electronic device 102 that may be used to implement the functionality described above according to some implementations. In a very basic configuration, the electronic device 102 includes, or accesses, components such as at least one control logic circuit, central processing unit, or processor 802 and one or more computer-readable media 804. Each processor 802 may itself comprise one or more processors or processing cores. Depending on the configuration of the electronic device 102, the computer-readable media 804 may be an example of tangible non-transitory computer storage media and may include volatile and nonvolatile memory and/or removable and non-removable media implemented in any type of technology for storage of information such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 802 directly or through another computing device. Accordingly, the computer-readable media 804 may be computer-readable media able to store and maintain instructions, modules or components executable by the processor 802.

The computer-readable media 804 may be used to store any number of functional components that are executable by the processor 802. In some implementations, these functional components comprise instructions or programs that are executable by the processor 802 and that, when executed, implement operational logic for performing the actions attributed above to the electronic device 102. Functional components of the electronic device 102 stored in the computer-readable media 804 may include the presentation module 124 and the interaction module 122, as described above, at least one of which may be executed by the processor 802 for presenting one or more content items 106 and the interfaces 200, 300, 500 and 600. Additionally, the presentation module 124 and/or the interaction module 122 may obtain the content item(s) 106, as well as library information of other users or entities. Other functional components may include an operating system and user interface module 806 for controlling and managing various functions of the electronic device 102. Depending on the type of the electronic device 102, the computer-readable media 804 may also optionally include other functional components, such as other modules 808, which may include applications, programs, drivers and so forth.

The computer-readable media 804 may also store data, data structures, and the like that are used by the functional components. For example, data stored by the computer-readable media 804 may include the one or more content items 106. Each content item 106 may include content 118 and metadata 120. The electronic device 102 may also include other data, which may include, for example, data used by the presentation module 124, the interaction module 122, the operating system and user interface module 806, and the other modules 808. Further, the electronic device 102 may include many other logical, programmatic and physical components, of which those described are merely examples that are related to the discussion herein.

FIG. 8 further illustrates the display 126, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 126 may be an active display such as a liquid crystal display, plasma display, light emitting diode display, organic light emitting diode display, and so forth. These displays may comprise drive electronics, such as a display drive matrix configured to affect individual pixels within the display 126. Additionally, in some implementations, the display 126 may be a 3D display capable of providing a 3D image. For example, the display 126 may produce a 3D image by providing alternating left-eye and right-eye images with or without the use of shuttering or filtering eyeglasses. Accordingly, in some implementations, the content items and user interface components herein may be rendered in 3D.

One or more communication interfaces 810 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 810 may allow a user of the electronic device 102 to access the World Wide Web, download content items from the content provider site 702, access online content, such as from a website or other network location, and the like. The communication interface 810 may further allow a user to access storage on another device, such as a user's computing device, a network attached storage device, cloud storage, or the like.

The electronic device 102 may further be equipped with various other input/output (I/O) components 812. Such I/O components may include a touchscreen and various user controls (e.g., buttons, a joystick, a keyboard, a mouse, etc.), speakers, a microphone, a camera, connection ports, and so forth. For example, the operating system 806 of the electronic device 102 may include suitable drivers configured to accept input from a keypad, keyboard, or other user controls and devices included as the I/O components 812. For instance, the user controls may include page turning buttons, navigational keys, a power on/off button, selection keys, and so on. Additionally, the electronic device 102 may include various other components that are not shown, examples of which include removable storage, a power source, such as a battery and power control unit, a global positioning system (GPS) device, a PC Card component, and so forth.

Example Computing Device(s)

Figure 9:
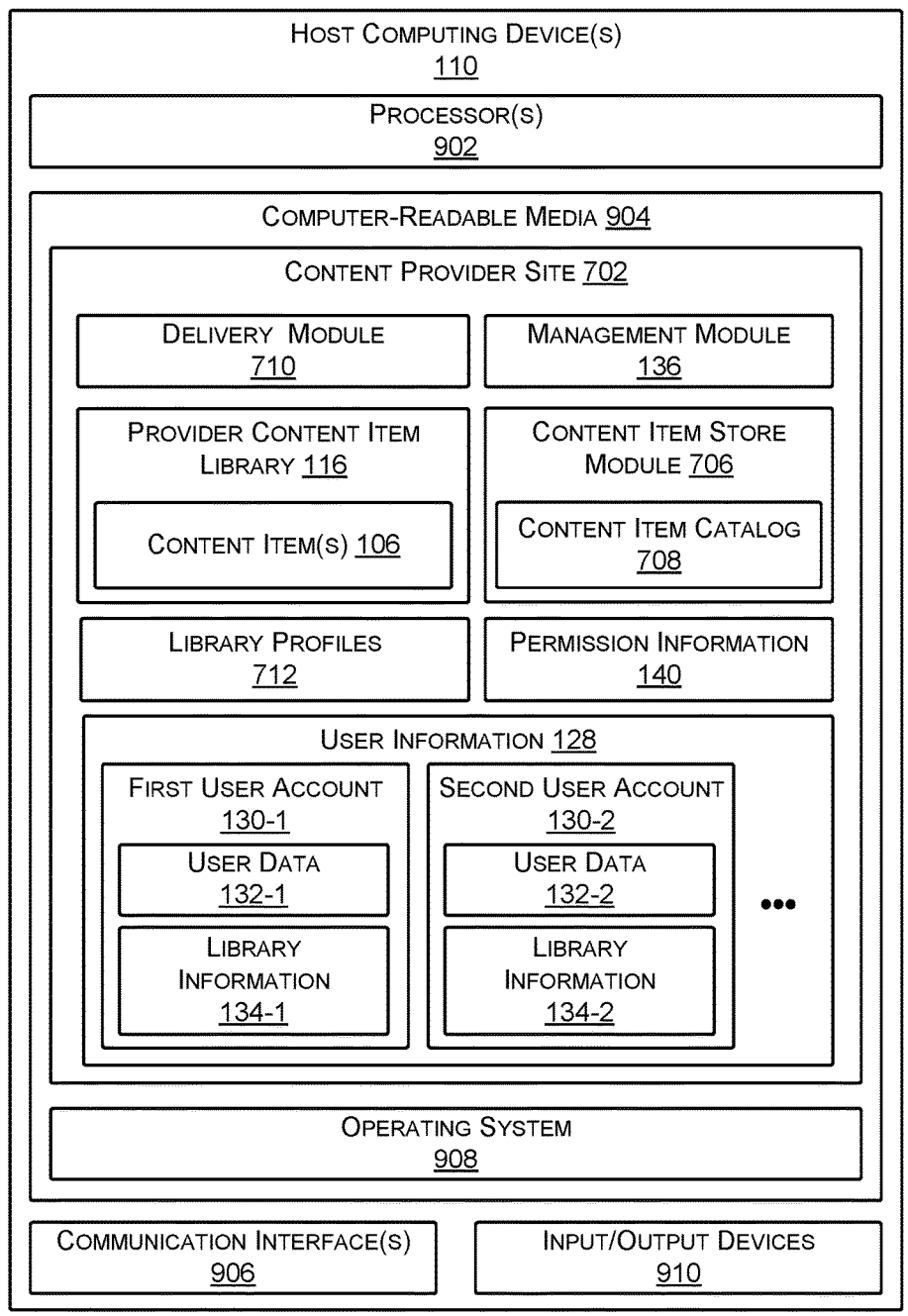
FIG. 9 illustrates select components of one or more example host computing devices of a content provider according to some implementations.

FIG. 9 illustrates select components of one or more host computing devices 110 that may be used to implement the functionality of the content provider site 702 according to some implementations. The content provider site 702 may be hosted on one or more servers or other types of computing devices that may be embodied in any number of ways. For instance, in the case of a server, the content provider site 702 may be implemented on a single server, a cluster of servers, a server farm or data center, a cloud hosted computing service, and so forth, although other computer architectures (e.g., a mainframe architecture) may also be used. Further, while the figures illustrate the components of the content provider site 702 as being present in a single location, it is to be appreciated that these components may be distributed across different computing devices and locations in any manner. Generally, the content provider site 702 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 9, an example host computing device 110 includes one or more processors 902, one or more computer-readable media 904, and one or more communication interfaces 906. The processor(s) 902 may be a single processing unit or a number of processing units, and may include single or multiple computing units or multiple processing cores. The processor(s) 902 can be configured to fetch and execute computer-readable instructions stored in the computer-readable media 904 or other computer-readable media.

The computer-readable media 904 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 110, the computer-readable media 904 may be a type of computer-readable storage media and may be a tangible non-transitory storage media.

The computer-readable media 904 may be used to store any number of functional components that are executable by the processors 902. In many implementations, these functional components comprise instructions or programs that are executable by the processors 902 and that, when executed, implement operational logic for performing the actions attributed above to the content provider site 702 and content provider 104. Functional components of the content provider site 702 that may be executed on the processors 902 for implementing the various functions and features related to providing content items and sharing libraries as described herein, include the management module 136, the content item store module 706, and the delivery module 710. Additional functional components stored in the computer-readable media 904 may include an operating system 908 for controlling and managing various functions of the host computing device(s) 110.

In addition, the computer-readable media 904 may include, or the host computing device(s) 110 may access, data that may include the provider content item library 116, including one or more content items 106. The data may further include library profiles 712 to provide library information related to historical figures or other entities, such as organizations. The data may further include the user information 128, including information for one or more user accounts 130, and corresponding user data 132 and library information 134. In addition, the computer-readable media 904 may include permission information 140, which may indicate content items from another library that a user may be permitted to access temporarily, such as during a library swap. In addition, the computer-readable media 904 may store or the host computing devices(s) 110 may access the content item catalog 708 used by the content item store module 706. The host computing device(s) 110 may also include many other logical, programmatic and physical components, of which those described above are merely examples that are related to the discussion herein.

The communication interface(s) 906 may include one or more interfaces and hardware components for enabling communication with various other devices, such as the electronic devices 102, over the network(s) 108. For example, communication interface(s) 906 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 108 may include any suitable network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Host computing device(s) 110 may further be equipped with various input/output devices 910. Such I/O devices 910 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Processes

FIGS. 10-13 illustrate example processes for accessing digital libraries and/or content items of others according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and frameworks described in the examples herein, although the processes may be implemented in a wide variety of other architectures, environments or frameworks.

Figure 10:
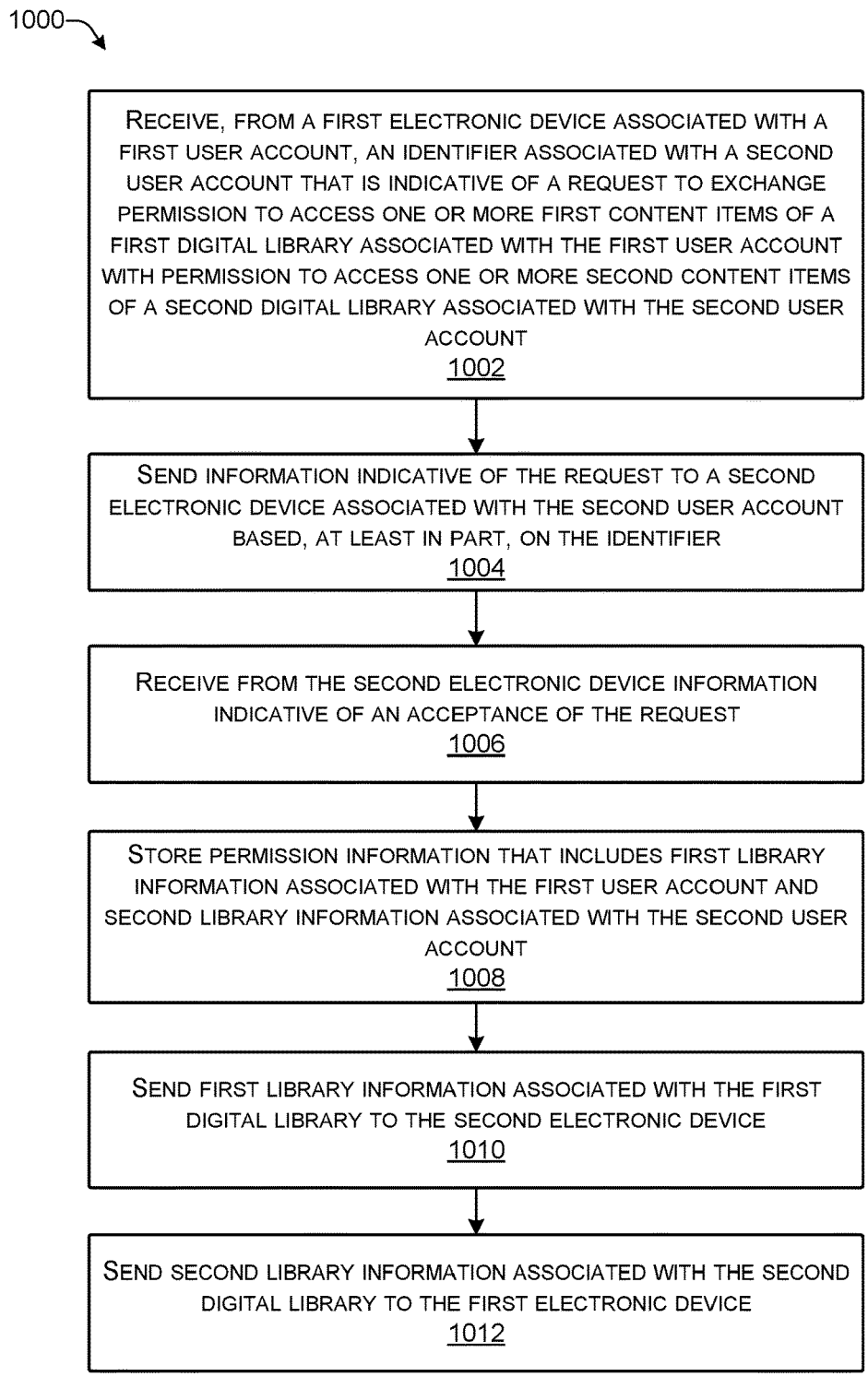
FIG. 10 is a flow diagram illustrating an example process executed by a computing device, such as that of a content provider, for enabling exchanging of permission to access libraries according to some implementations.

FIG. 10 is a flow diagram illustrating an example process 1000 that may be executed by a computing device, such as of a content provider, according to some implementations.

At 1002, the computing device receives from a first device associated with a first user account, an identifier associated with a second user account. For example, the identifier may indicate that the second user account is a target of a request to swap access to digital libraries. In some cases, the identifier is indicative of a request to exchange permission to access one or more first content items of a first digital library associated with the first user account with permission to access one or more second content items of a second digital library associated with the second user account. The swap may be a temporary exchange of access to content items, such that access to first content items of a first digital library associated with the first user account is exchanged for access to second content items of a second digital library associated with the second user account. Thus, the computing device of a content provider may receive from an electronic device of a first user an identifier of a second user, with which the first user desires to exchange digital libraries.

At 1004, the computing device sends information indicative of the request to a second electronic device associated with the second user account based at least in part on the identifier. For example, the computing device may determine from the identifier an electronic device associated with the second user account, and may send the library swap request to the electronic device associated with the second user account. In some cases, the swap request may be maintained at the computing device until the second user logs in to the second user account, and the swap request may then be sent to a device that the second user uses to log in to the second user account.

At 1006, the computing device receives from the second electronic device information indicative of an acceptance of the request. For example, the second user of the second device may be presented with an interface that enables the second user of the second device to accept the request to swap digital libraries, which acceptance is sent to the computing device. In some cases, the acceptance may be performed using a web browser, while in other cases, the acceptance may be performed using a mobile application or other suitable program, interface, or the like.

At 1108, the computing device stores permission information that includes first library information associated with the first user account and second library information associated with the second user account. For example, the first library information may identify one or more first content items in the first user's library that are permitted to be accessed by the second user as a result of the swap, and the second library information identifies one or more second content items in the second user's library that are permitted to be accessed by the first user as a result of the exchange of permission to access. In some cases, the first user may use any electronic device affiliated with the first user account to access the content items included in the second library information. Similarly, the second user may use any electronic device affiliated with the second user account to access the content items included in the first library information.

At 1010, the computing device sends the first library information associated with the first digital library to the second electronic device or to another electronic device associated with the second user account. For example, the first library information associated with the first user account may identify one or more content items included in the digital library of the first user that the second user is permitted to access. In some cases, the first library information is displayed to the second user when the second user logs in to the second user account, such as through a web browser or other program or application. In other cases, the first library information may be sent to a device of the second user and may be displayed in an interface on the device. As mention above, the second user may be able to select one or more of the content items identified in the first library information to be accessed on a device of the second user associated with the second user account.

At 1012, the computing device sends the second library information associated with the second digital library to the first electronic device or to another electronic device associated with the first user account. For example, the second library information associated with the second user account may identify one or more content items included in the digital library of the second user that the first user is permitted to access. In some cases, the second library information is displayed to the first user when the first user logs in to the first user account, such as through a web browser or other program or application. In other cases, the second library information may be sent to a device of the first user and may be displayed in an interface on the device. The first user may be able to select one or more of the content items identified in the second library information to be accessed on a device of the first user associated with the first user account.

Figure 11:
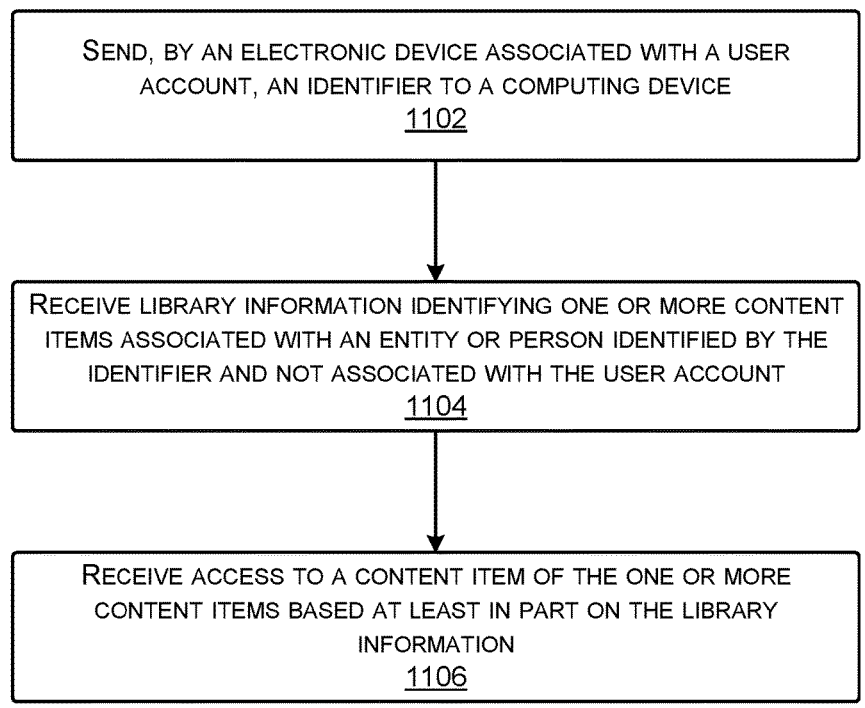
FIG. 11 is a flow diagram illustrating an example process executed on an electronic device for accessing a digital library of another according to some implementations.

FIG. 11 is a flow diagram illustrating an example process 1100 that may be executed by an electronic device of a user according to some implementations.

At 1102, the electronic device, which is associated with a user account, sends an identifier to a computing device. For example, the identifier may identify a person or entity that is not associated with the user account, and the library of which the user of the electronic device would like to have access.

At 1104, the electronic device receives library information identifying one or more content items associated with an entity or person identified by the identifier and not associated with the electronic device. For example, the library information may belong to or be otherwise associated with a person or entity other than a user associated with the user account. As one example, the person or entity not associated with the user account may be another user with which the user would like to swap access to digital libraries, such as by exchanging permission to access, as described above. As another example, the person or entity not associated with the user account may be any of a historical figure, a celebrity, an author, an educator or teacher, an organization, or a member of a group with which a user of the electronic device is affiliated, such as a social network. Thus, the user may be able to access a digital library of another person or entity not associated with the user's account, such as by selecting the person or entity from a list in a user interface, conducting a search in a user interface, and so forth.

At 1106, the electronic device receives access to a content item of one or more content items based at least in part on the library information. For example, the user of the electronic device may access the library information and select a content item to access using the library information associated with the entity or user.

Figure 12:
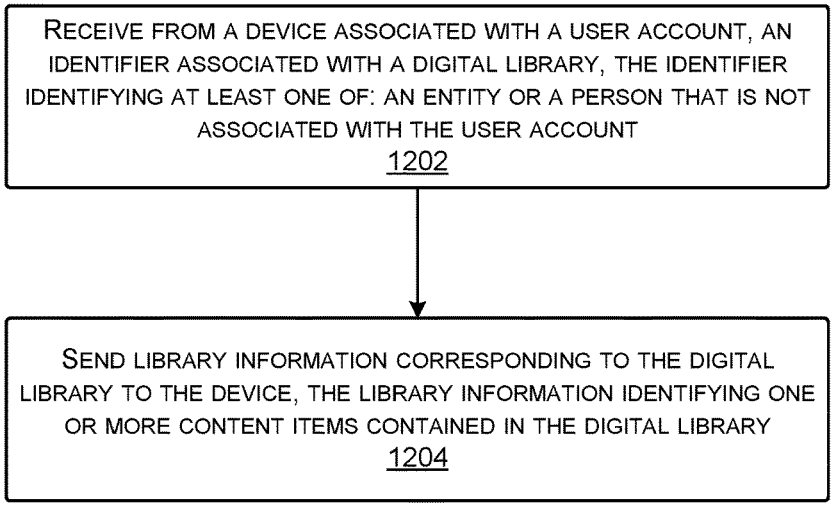
FIG. 12 is a flow diagram illustrating an example process executed on a computing device for enabling sharing of a library according to some implementations.

FIG. 12 is a flow diagram illustrating an example process 1200 that may be executed by a computing device, such as of a content provider, according to some implementations.

At 1202, the computing device receives, from a device associated with a user account, an identifier associated with a digital library. The identifier may identify at least one of an entity or a person that is not associated with the device or the user account. For example, the user of the device may wish to access a digital library of a selected person or entity. As one example, the person or entity not associated with the user account may be another user with which the user would like to swap access to digital libraries, such as by exchanging permission to access, as described above. As another example, the person or entity not associated with the user account may be any of a historical figure, a celebrity, an author, an educator or teacher, an organization, or a member of a group with which a user of the electronic device is affiliated, such as a social network. Thus, the user may be able to access a digital library of another person or entity not associated with the user's account, such as by selecting the person or entity from a list in a user interface, conducting a search in a user interface, and so forth.

At 1204, the computing device sends library information corresponding to the digital library to the device. For example, the library information may identify one or more content items included in the library associated with the identified entity or person.

Figure 13:
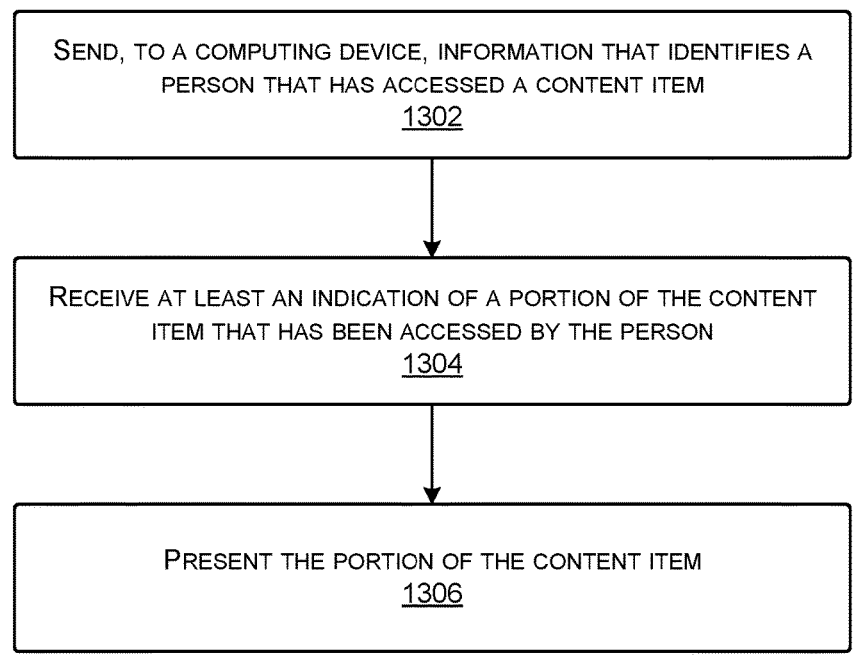
FIG. 13 is a flow diagram an example process executed on an electronic device to enabling following content consumption of another person according to some implementations.

FIG. 13 is a flow diagram illustrating an example process 1300 that may be executed by an electronic device of a user according to some implementations.

At 1302, the electronic device sends to a computing device, information that identifies a person that has accessed a content item. As one example, the electronic device may send a selection of the person to the computing device. For example, the user of the device may access an interface to select a person whose reading progress or consumption information the user would like to follow or view with respect to the content item.

At 1304, the electronic device receives at least an indication of a portion of the content item that has been accessed by the person. For example, the device may receive at least an identifier of a page of content that the person is currently reading in the content item. Thus, if the user already has an instance of the content item on the electronic device, the electronic device may automatically access the content item and display the indicated portion. In other examples, the electronic device receives a portion of content of the content item that the person is reading, such as by downloading the portion of content.

At 1306, the electronic device presents the portion of the content item. For example, the electronic device may display to the user the page of the content item that the identified person is currently reading. In some cases, the electronic device may also display personal annotations, comments or reviews provided by the identified person.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method, comprising:
   receiving, from a first electronic device associated with a first user account, an identifier associated with a second user account, wherein the first user account and the second user account are associated with a same user, and wherein the identifier is indicative of a request to exchange permission to access one or more first content items of a first digital library associated with the first user account with permission to access one or more second content items of a second digital library associated with the second user account;
   sending information indicative of the request to a second electronic device associated with the second user account based, at least in part, on the identifier;
   receiving, from the second electronic device, information indicative of an acceptance of the request;
   determining first library information that identifies the one or more first content items that are available to the second user account;
   determining second library information that identifies the one or more second content items that are available to the first user account;
   providing access to the second library information to the first electronic device; and
   providing access to the first library information to the second electronic device.

2. A computer-implemented method comprising:
   sending, by an electronic device associated with a first user account corresponding to a first digital library, an identifier to a computing device, the identifier indicative of a request to exchange a first permission to access one or more first content items of the first digital library with a second permission to access one or more second content items of a second digital library associated with a second user account, the first user account and the second user account associated with a same user;
   receiving library information that identifies at least the one or more second content items included in the second digital library; and
   receiving access to a particular content item of the one or more second content items based, at least in part, on the library information.

3. A computing device comprising:
   one or more processors;
   one or more computer-readable media, the one or more computer readable media including a library of digital content items, first library information corresponding to a first user account, and second library information corresponding to a second user account, the first user account and the second user account associated with a same user; and instructions maintained in the one or more computer-readable media that, when executed by the one or more processors, cause the one or more processors to perform operations including:

receiving, from a first electronic device associated with the first user account, a request to exchange a first permission to access one or more first content items of the library of digital content items associated with the first user account with a second permission to access one or more second content items of the library of digital content items associated with the second user account;

sending, to a second electronic device associated with the second user account, information indicative of the request;

providing access by the first electronic device to one or more second content items; and providing access by the second electronic device to the one or more first content items.

4. The method as recited in claim 1, wherein receiving the identifier associated with the second user account further comprises receiving at least one of:

an email address associated with the second user account;

an account identifier associated with the second user account; or a username of the same user associated with the second user account.

5. The method as recited in claim 1, further comprising:

receiving, from the first electronic device, an indication of one or more types of content items associated with the first digital library to be excluded from the one or more first content items that are available to the second user account.

6. The method as recited in claim 1, wherein the request is a first request, further comprising:

associating at least one annotation with a particular content item of the one or more first content items receiving, from the second device, a second request to access the particular content item; and sending to the second device the particular content item and the at least one annotation associated with the one or more first content items.

7. The method as recited in claim 1, wherein the request is a first request, further comprising:

receiving, from the first electronic device, a second request to access content of one of the one or more second content items; and sending the content to the first electronic device.

8. The method as recited in claim 1, further comprising:

determining that a particular content item of the one or more first content items is prohibited from being identified in the one or more first content items that are available to the second user account; and excluding information related to the particular content item from being included in the one or more first content items that are available to the second user account.

9. The computer-implemented method as recited in claim 2, further comprising:

creating, by combining the one or more first content items and the one or more second content items, shared library information; and presenting one or more representations corresponding to the shared library information.

10. The computer-implemented method as recited in claim 2, further comprising:

including with the identifier sent to the computing device an indication of a content item to be excluded from the exchange of permission to access.

11. The computing device as recited in claim 3, wherein receiving the request further comprises receiving at least one of:

an email address associated with the second user account;

an account identifier associated with the second user account; or a username of the same user associated with the second user account.

12. The computing device as recited in claim 3, the operations further including:

receiving, from the first electronic device, an indication of one or more types of content items to be excluded from access by the second electronic device; and excluding the one or more types of content items from access by the second electronic device.

13. The computing device as recited in claim 3, wherein providing access by the first electronic device to one or more second content items further comprises:

determining that the first electronic device and the second electronic device are located at a first location; and wherein providing access by the first electronic device to one or more second content items is based at least in part on the determining.

14. The computing device as recited in claim 3, wherein the first content items include one or more of digital text items, digital audio items, digital video items, games, or applications.

15. The computing device as recited in claim 3, further comprising adding, based at least in part upon the same user acquiring an additional content item, the additional content item to the one or more first content items.

16. The method as recited in claim 7, further comprising:

sending an instruction to the first electronic device to disable access to the content based, at least in part, on at least one of:

an amount of time that has passed since sending the content to the first electronic device; or an amount of content sent to the first electronic device.

17. The computer-implemented method as recited in claim 9, further comprising receiving, from the electronic device associated with the first user account, an indication that at least one of the one or more first content items is to be excluded from the shared library information.

18. The computer-implemented method as recited in claim 9, further comprising receiving an indication of one or more types of content items to be excluded from the shared library information.

19. The computer-implemented method as recited in claim 9, further comprising sending the shared library information to the electronic device associated with the first user account and to a second electronic device associated with the second user account.

20. The computer-implemented method as recited in claim 19, further comprising:

receiving, from the electronic device or the second electronic device, a request to access content of one or more content items identified in the shared library information; and sending the content to the electronic device or the second electronic device.

* * * * *